United States Patent
Rivkin et al.

(10) Patent No.: US 12,452,531 B2
(45) Date of Patent: Oct. 21, 2025

(54) APPARATUS AND METHOD FOR CONTROLLING A ROBOT PHOTOGRAPHER WITH SEMANTIC INTELLIGENCE

(71) Applicant: SAMSUNG ELECTRONICS CO., LTD., Suwon-si (KR)

(72) Inventors: Dmitriy Rivkin, Montreal (CA); Gregory Lewis Dudek, Westmount (CA)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 155 days.

(21) Appl. No.: 18/373,078

(22) Filed: Sep. 26, 2023

(65) Prior Publication Data

US 2024/0114236 A1    Apr. 4, 2024

Related U.S. Application Data

(60) Provisional application No. 63/411,287, filed on Sep. 29, 2022.

(51) Int. Cl.
*H04N 23/66* (2023.01)
*B25J 9/16* (2006.01)
(Continued)

(52) U.S. Cl.
CPC .............. *H04N 23/66* (2023.01); *B25J 9/163* (2013.01); *B25J 9/1697* (2013.01); *B25J 13/003* (2013.01);
(Continued)

(58) Field of Classification Search
CPC ......... H04N 23/66; H04N 23/64; B25J 9/163; B25J 9/1697; B25J 13/003; B25J 19/023;
(Continued)

(56) References Cited

U.S. PATENT DOCUMENTS 9,570,107 B2 * 2/2017 Boiman ................... H04N 9/87
10,094,655 B2 * 10/2018 Sabitov ................ G06V 40/172
(Continued)

FOREIGN PATENT DOCUMENTS

CN    106101536 A    11/2016
CN    113228620 A    8/2021
(Continued)

OTHER PUBLICATIONS

International Search Report and Written Opinion issued Jan. 5, 2024 by the International Searching Authority in International Patent Application No. PCT/KR2023/015100. (PCt/ISA/220, PCT/ISA/210 and PCT/ISA/237).
(Continued)

*Primary Examiner* — Hung H Lam
(74) *Attorney, Agent, or Firm* — Sughrue Mion, PLLC

(57) ABSTRACT

An electronic device for controlling a photographic system may obtain a video stream and a user query for a target event, obtain a set of photos from the video stream, obtain at least one photoshoot suggestion based on the user query via a language model, obtain a snapped photo for the target event based on the at least one photoshoot suggestion, in response to a given video frame included in the video stream satisfying a target content criterion, and output one or more photos selected from the set of photos and the snapped photo as event photos.

20 Claims, 18 Drawing Sheets

(51) Int. Cl.
  *B25J 13/00* (2006.01)
  *B25J 19/02* (2006.01)
  *G06T 7/70* (2017.01)

(52) U.S. Cl.
  CPC ............... *B25J 19/023* (2013.01); *G06T 7/70* (2017.01); *G06T 2207/10016* (2013.01); *G06T 2207/30244* (2013.01)

(58) Field of Classification Search
  CPC . B25J 11/00; B25J 9/1679; G06T 7/70; G06T 2207/10016; G06T 2207/30244
  See application file for complete search history.

(56) References Cited

U.S. PATENT DOCUMENTS

| | | | |
|---|---|---|---|
| 12,309,447 | B2 | 5/2025 | Huo et al. |
| 2016/0019240 | A1 | 1/2016 | Hammontree et al. |
| 2020/0372116 | A1 | 11/2020 | Gao et al. |
| 2021/0117471 | A1* | 4/2021 | Rav-Acha ............ G06F 16/7837 |
| 2022/0166919 | A1 | 5/2022 | Weissenberger et al. |
| 2022/0172426 | A1 | 6/2022 | Lissi |
| 2024/0412542 | A1* | 12/2024 | O'Neill ................. G06V 10/25 |
| 2025/0104392 | A1* | 3/2025 | Saraee ................. G06V 10/40 |

FOREIGN PATENT DOCUMENTS

| | | |
|---|---|---|
| CN | 115002340 A | 9/2022 |
| EP | 4 195 658 A1 | 6/2023 |
| JP | 2006-254222 A | 9/2006 |
| JP | 2007-306200 A | 11/2007 |
| KR | 10-2014-0147462 A | 12/2014 |
| KR | 10-2458463 B1 | 10/2022 |
| WO | 2018/097889 A1 | 5/2018 |
| WO | 2021028656 A1 | 2/2021 |
| WO | 2022/011534 A1 | 1/2022 |
| WO | 2022/226140 A1 | 10/2022 |

OTHER PUBLICATIONS

Extended European Search Report issued Aug. 11, 2025 in European Patent Application No. 23873248.1.
Domitriy Rivkin et al., "ANSEL Photobot: A Robot Event Photographer with Semantic Intelligence", Cornell University Library, XP091439452, 2023 (7 pages total).

* cited by examiner

FIG. 7B

Imagine that a photographer is hired to take pictures of an event. Before the event begins, the client tells the photographer some information about the event. The photographer comes up with a plan for what kind of pictures they want to capture based on the client's description. Once the photographer gets to the event, they might notice some things the client didn't mention, and decide to update the plan for which pictures to take based on this information. } Preamble Your job is to help the photographer decide which concepts, if any, to incorporate in their plan.

For example:

Event description: A child's birthday party
Observations:
  - Many children playing together
  - A woman giving a present to a child
  - A clown making balloon animals
  - A child opening presents
  - A table and chairs Concepts to add: clown, balloon animals Event description: A wedding
Observations:
  - A pile of wedding presents
  - Brad Pitt drinking a Martini
  - The bride and groom cutting the cake
  - A bottle of whiskey on a bar
  - People talking Concepts to add: Brad Pitt Event description: A business meeting
Observations:
  - People shaking hands
  - People talking
  - A powerpoint presentation Concepts to add: None ⎫
⎬ Examples
⎭

Event description: The grand opening of a restaurant ← Event description
  - People eating ⎱
  - People drinking ⎬ Captions
  - A tower of champagne glasses ⎪
  - A waiter brining food to a table ⎭

Concepts to add: ← Demand

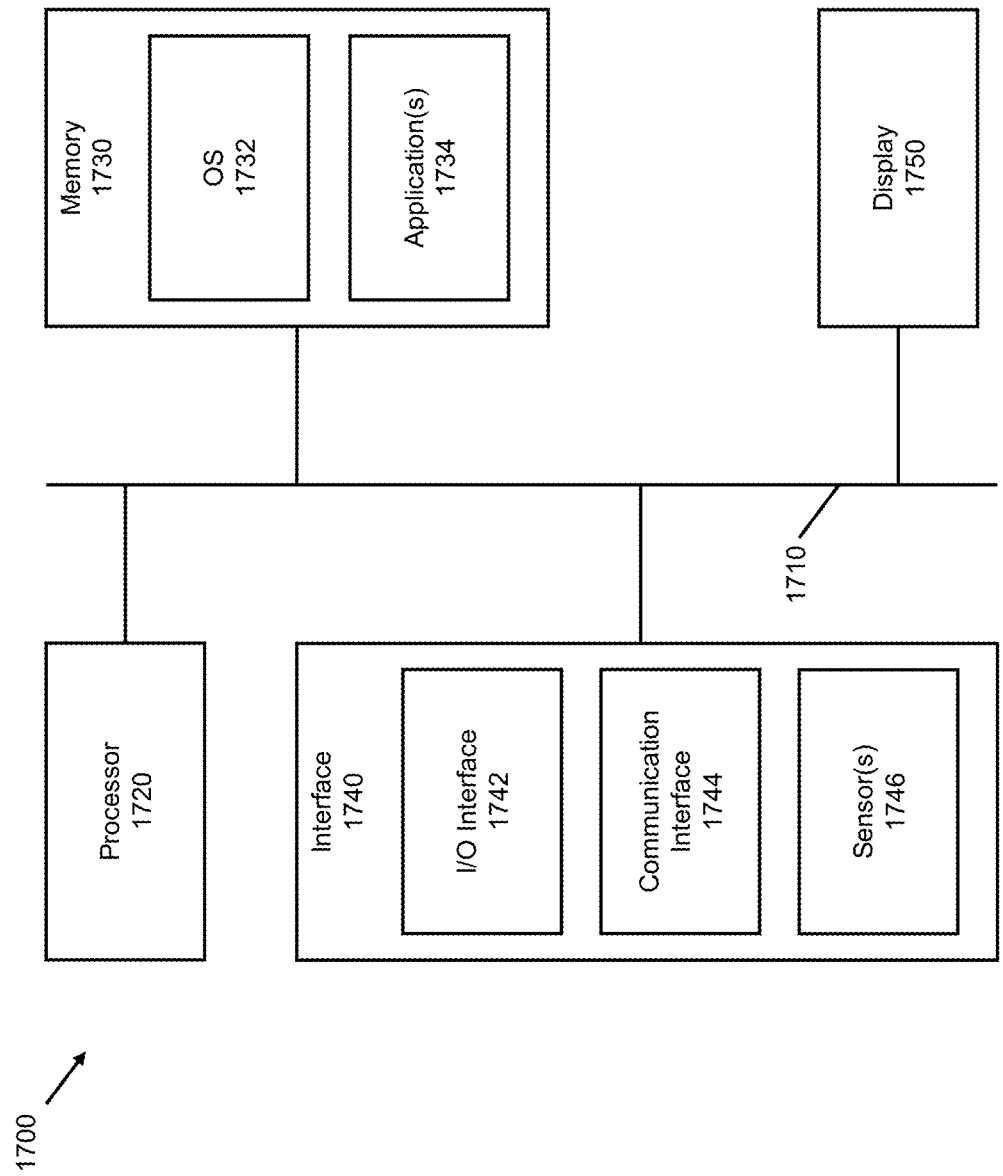

APPARATUS AND METHOD FOR CONTROLLING A ROBOT PHOTOGRAPHER WITH SEMANTIC INTELLIGENCE

CROSS-REFERENCE TO RELATED APPLICATION

This application is based on and claims priority under 35 U.S.C. § 119 to U.S. Provisional Patent Application No. 63/411,287 filed on Sep. 29, 2022, in the U.S. Patent & Trademark Office, the disclosure of which is incorporated herein by reference in its entirety.

BACKGROUND

1. Field

The disclosure relates to an apparatus and a method for controlling a robot photographer with semantic intelligence, and particularly, to an apparatus and a method for controlling the robot photographer to capture event photos by interpreting user queries through a large language model.

2. Description of Related Art

Robot photographers have the ability to capture personal snapshots or document events like parades or natural phenomena.

Robot photographers have diverse applications, ranging from optimizing portraits to recording complex activities like surgery or military operations. Some studies focused on local actions like framing shots and adhering to composition rules. Larger-scale challenges involve planning camera trajectories for visual coverage of phenomena, maintaining visual contact with subjects, capturing moving subjects, and employing a swarm of robot paparazzi.

Previous research in this field has concentrated on taking high-quality photos, evaluated by volunteers or established quality models. Specifically, earlier efforts involved tasks such as detecting people, navigating to them, and applying composition heuristics. Later work adopted machine-learning techniques; for instance, deep reinforcement learning was used to capture well-composed photos of people.

In order to meet the demand to accurately capture images that suit specific events, there is a growing need to equip robotic photographers with the ability to comprehend the nuances of photography scenes within the realm of social conventions.

SUMMARY

According to an aspect of the present disclosure, an electronic device for controlling a photographic system may include: a memory storing one or more instructions; and one or more processors configured to: obtain a video stream and a user query for a target event; obtain a set of photos from the video stream; obtain at least one photoshoot suggestion based on the user query via a language model; obtain a snapped photo for the target event based on the at least one photoshoot suggestion, in response to a given video frame included in the video stream satisfying a target content criterion; and output one or more photos selected from the set of photos and the snapped photo as event photos.

The given video frame meets the target content criterion when a similarity score between a text embedding extracted from the current video frame and an image embedding extracted from the at least one photoshoot suggestion, is greater than similarity scores between each of text embeddings extracted from previous video frames within the video stream and the image embedding extracted from the at least one photoshoot suggestion.

The electronic device may further include a first camera configured to acquire the video stream and a second camera configured to acquire the snapped photo. The at least one photoshoot suggestion may include a plurality of photoshoot suggestions. Any one or any combination of the one or more processors may be configured to: extract an image embedding from the current video frame acquired at a current pose of the first camera; obtain a plurality of text embeddings from the plurality of photoshoot suggestions, respectively; compute similarity scores between the image embedding and each of the plurality of text embeddings; select a first photoshoot suggestion that has a highest similarity score, from among the similarity scores; increment a counter that is initially set for the selected first photoshoot suggestion over time; decrease the similarity score for the selected first photoshoot suggestion over time by reducing the similarity score by a value of the counter that increases over time; select a second photoshoot suggestion that initially had a second-highest similarity score and has surpassed all other photoshoot suggestions in similarity score, and adjust the current pose of the first camera to capture the selected second photoshoot suggestion.

The electronic device may further include a first camera configured to acquire the video stream and a second camera configured to acquire the snapped photo, wherein any one or any combination of the one or more processors are configured to: extract an image embedding from the given video frame that is acquired at a current pose of the first camera; obtain a text embedding from the at least one photoshoot suggestion; acquire translation coordinates and rotation angles of a next pose of the first camera, based on a change in similarity between the image embedding and the text embedding with respect to change in each pixel in the video frame; adjust the pose of the first camera based on the translation coordinates and the rotation angles; and control the first camera to acquire a next video frame in the adjusted pose.

The electronic device may further include a first camera configured to acquire the video stream and a second camera configured to acquire the snapped photo, wherein any one or any combination of the one or more processors are configured to: extract an image embedding from the video frame that is acquired at a current pose of the first camera; obtain a text embedding from the at least one photoshoot suggestion; acquire translation coordinates and rotation angles of a next pose of the first camera, based on a change in similarity between the image embedding and the text embedding with respect to change in camera pose parameters of the current pose of the first camera; adjust the pose of the first camera based on the translation coordinates and the rotation angles; and control the camera to acquire a next video frame in the adjusted pose.

Any one or any combination of the one or more processors are configured to: construct a full query based on the user query; input the full query to the language model; acquire the at least one photoshoot suggestion as an output of the language model; and control a camera to obtain the snapped photo based on the at least one photoshoot suggestion.

Any one or any combination of the one or more processors are configured to: obtain a voice signal during the target event; identify a key event descriptor based on the voice signal acquired during the target event; construct the full query based on the user query and the key event descriptor identified from the voice signal; and input the full query to the language model to acquire the least one photoshoot suggestion that reflects the identified key event descriptor.

Any one or any combination of the one or more processors are configured to: identify a key event descriptor from the set of photos; construct a full query based on the key event descriptor identified from the set of photos and the user query; and input the full query to the language model to acquire the least one photoshoot suggestion that reflects the identified key event descriptor.

Any one or any combination of the one or more processors are configured to: determine whether any one of the at least one photoshoot suggestion includes a photography composition directive; and discard the photoshoot suggestion including the photography composition directive.

Any one or any combination of the one or more processors are configured to: determine whether to use a photo gallery application or a camera application based on device capabilities of the electronic device and the user query; based on the photo gallery application being activated, access a photo gallery of the electronic device to acquire the set of photos that has been stored in the memory; and based on the camera application being activated, acquire the set of photos and the snapped photo to be stored in the memory.

According to another aspect of the present disclosure, a method for controlling a photographic system may include: obtaining a video stream and a user query for a target event; obtaining a set of photos from the video stream; obtaining at least one photoshoot suggestion based on the user query via a language model; obtaining a snapped photo for the target event based on the at least one photoshoot suggestion, in response to a given video frame included in the video stream satisfying a target content criterion; and outputting one or more photos selected from the set of photos and the snapped photo as event photos.

The method may further include: determining that the given video frame satisfies the target content criterion when a similarity score between a text embedding extracted from the given video frame and an image embedding extracted from the at least one photoshoot suggestion, is greater than similarity scores between each of text embeddings extracted from previous video frames within the video stream and the image embedding extracted from the at least one photoshoot suggestion.

The video stream may be acquired by a first camera, and the snapped photo is acquired by a second camera. The at least one photoshoot suggestion may include a plurality of photoshoot suggestions. The method may further include: extracting an image embedding from the given video frame acquired at a given pose of the first camera; obtaining a plurality of text embeddings from the plurality of photoshoot suggestions, respectively; computing similarity scores between the image embedding and each of the plurality of text embeddings; selecting a first photoshoot suggestion that has a highest similarity score, from among the similarity scores; incrementing a counter that is initially set for the selected first photoshoot suggestion over time; decreasing the similarity score for the selected first photoshoot suggestion over time by reducing the similarity score by a value of the counter that increases over time; selecting a second photoshoot suggestion that initially had a second-highest similarity score and has surpassed all other photoshoot suggestions in similarity score; and adjusting the given pose of the first camera to capture the selected second photoshoot suggestion.

The video stream may be acquired by a first camera, and the snapped photo is acquired by a second camera. The method may further include: extracting an image embedding from the given video frame that is acquired at a given pose of the first camera; obtaining a text embedding from the at least one photoshoot suggestion; acquiring translation coordinates and rotation angles of a next pose of the first camera, based on a change in similarity between the image embedding and the text embedding with respect to change in each pixel in the video frame; adjusting the pose of the first camera based on the translation coordinates and the rotation angles; and controlling the first camera to acquire a next video frame in the adjusted pose.

The video stream may be acquired by a first camera, and the snapped photo is acquired by a second camera. The method may further include: extracting an image embedding from the video frame that is acquired at a given pose of the first camera; obtaining a text embedding from the at least one photoshoot suggestion; acquiring translation coordinates and rotation angles of a next pose of the first camera, based on a change in similarity between the image embedding and the text embedding with respect to change in camera pose parameters of the given pose of the first camera; adjusting the pose of the first camera based on the translation coordinates and the rotation angles; and controlling the camera to acquire a next video frame in the adjusted pose.

The method may further include: constructing a full query based on the user query; inputting the full query to the language model; acquiring the at least one photoshoot suggestion as an output of the language model; and controlling a camera to obtain the snapped photo based on the at least one photoshoot suggestion.

The method may further include: obtaining a voice signal during the target event; identifying a key event descriptor based on the voice signal acquired during the target event; constructing the full query based on the user query and the key event descriptor identified from the voice signal; and inputting the full query to the language model to acquire the least one photoshoot suggestion that reflects the identified key event descriptor.

The method may further include: identifying a key event descriptor from the set of photos; constructing a full query based on the key event descriptor identified from the set of photos based on the user query; and inputting the full query to the language model to acquire the least one photoshoot suggestion that reflects the identified key event descriptor.

The method may further include: determining whether any one of the at least one photoshoot suggestion includes a photography composition directive; and discarding the photoshoot suggestion including the photography composition directive.

According to another aspect of the present disclosure, there is provided a non-transitory computer-readable storage medium storing a program that is executable by a processor to perform a method for controlling a photographic system. The method may include obtaining a video stream and a user query for a target event; obtaining a set of photos from the video stream; obtaining at least one photoshoot suggestion based on the user query via a language model; obtaining a snapped photo for the target event based on the at least one photoshoot suggestion, in response to a given video frame included in the video stream satisfying a target content criterion; and outputting one or more photos selected from the set of photos and the snapped photo as event photos.

Additional aspects will be set forth in part in the description that follows and, in part, will be apparent from the description, or may be learned by practice of the presented embodiments of the disclosure.

BRIEF DESCRIPTION OF THE DRAWINGS

The above and other aspects, features, and aspects of embodiments of the disclosure will be more apparent from the following description taken in conjunction with the accompanying drawings, in which:

FIGS. 7A and 7B illustrate a language model query structure for acquiring a key event descriptor, and an example fully query for acquiring the key event descriptor, respectively, according to one or more embodiments of the present disclosure;

FIG. 17 is a diagram of components of one or more electronic devices of FIG. 16, according to one or more embodiments of the present disclosure.

DETAILED DESCRIPTION

Figure 1:
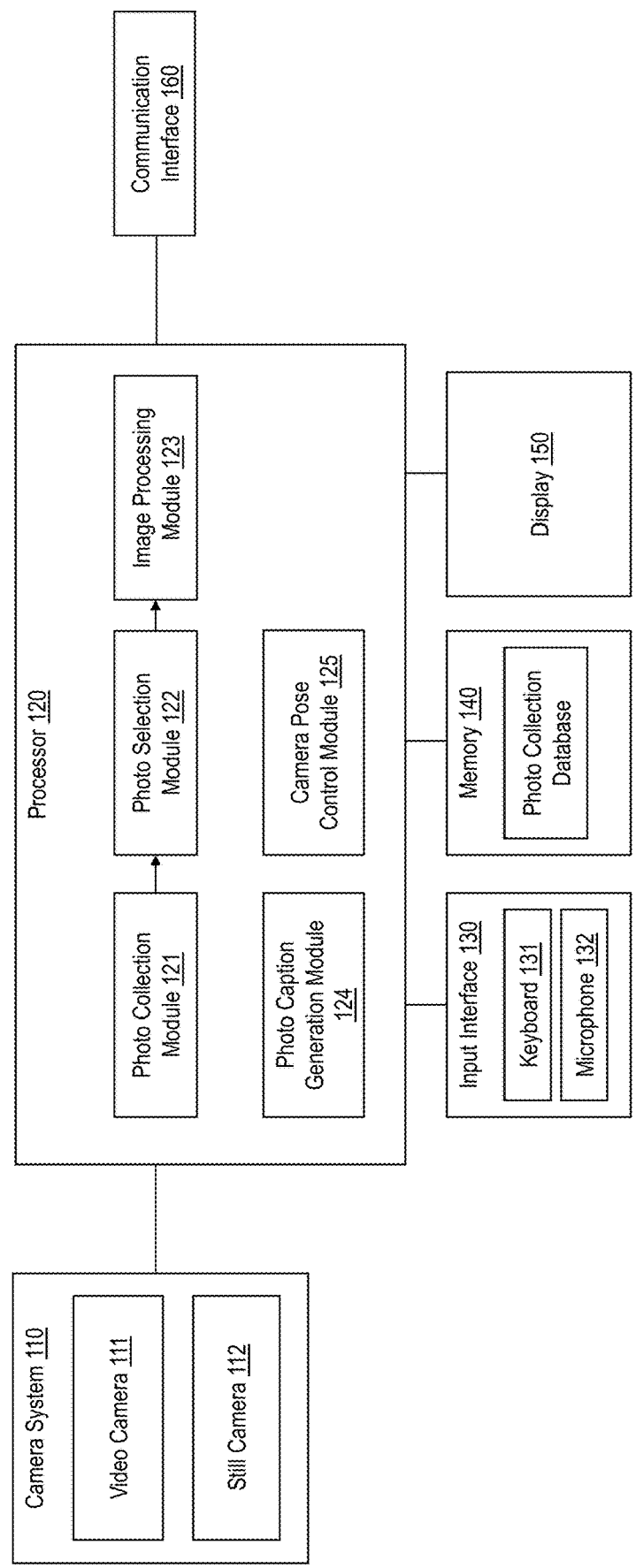
FIG. 1 is a diagram showing an electronic device for performing automated photography according to one or more embodiments of the present disclosure.

Example embodiments are described in greater detail below with reference to the accompanying drawings.

In the following description, like drawing reference numerals are used for like elements, even in different drawings. The matters defined in the description, such as detailed construction and elements, are provided to assist in a comprehensive understanding of the example embodiments. However, it is apparent that the example embodiments can be practiced without those specifically defined matters. Also, well-known functions or constructions are not described in detail since they would obscure the description with unnecessary detail.

Expressions such as "at least one of," when preceding a list of elements, modify the entire list of elements and do not modify the individual elements of the list. For example, the expression, "at least one of a, b, and c," should be understood as including only a, only b, only c, both a and b, both a and c, both b and c, all of a, b, and c, or any variations of the aforementioned examples.

While such terms as "first," "second," etc., may be used to describe various elements, such elements must not be limited to the above terms. The above terms may be used only to distinguish one element from another.

The term "module" or "component" is intended to be broadly construed as hardware, firmware, or a combination of hardware and software.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware may be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

In the present disclosure, the term "user query" may refer to a textual or spoken input provided by a user seeking information, assistance, or interaction with a large language model or other natural language processing system. The user query may include one or more sentences or phrases in natural language and may be provided by the user to express a question, request, command, or statement.

The terms "event," "photography event," or "target event" may refer to a specific occurrence, situation, or happening, and may encompass a wide range of occasions or situations, such as weddings, birthdays, concerts, sports games, festivals, or any gathering or moment that people want to capture through photographs.

The term "event photos" may refer to photographs captured during a specific event.

The term "photoshoot suggestions" may refer to recommendations, guidance, or ideas proposed by an AI-powered language model to assist a user or a robot photographer in planning and conducting a photography session. The photoshoot suggestions may be generated based on a user query describing a specific photography event, and may include advice on subjects and concepts to be captured.

The term "selected" may be used interchangeably with the terms "identified," "chosen," or "decided upon."

The phrase "in response to" may be used interchangeably with the phrases "based on," "according to," "as a result of," and "when."

One or more embodiments of the present disclosure provide an apparatus and a method for utilizing large language models (e.g., Chat Generative Pre-trained Transformer (GPT), Bidirectional Encoder Representations from Transformers (BERT), Text-to-Text Transfer Transformer (T5)) and a vision-language model (VLM) in the realm of robotic planning and sampling, particularly within the domain of automated photography and automated photographic documentation.

When a user provides a high-level depiction of a photography event, a large language model generates a natural language list of photo descriptions that a photographer would typically capture during the event. Subsequently, a vision-language model is employed to identify scenes or objects that best match the natural language list of photo descriptions in a video stream. The video stream may be acquired via a camera placed in a stationary position, typically in a room or an area where interesting moments might occur, and configured to automatically capture short video sequences using on-device machine learning and face recognition to determine optimal moments to capture. In embodiments of the present disclosure, the execution of machine learning and face recognition is not restricted to occurring solely on a client device. Machine learning and face recognition may also be hosted on a server which communicates with a client device, and this server-client interaction involves the client device sending images and video clips to the server for processing. A still camera (also referred to as "snapping camera" or "shutter-equipped camera") may be directed to capture scenes or objects that align most closely with the natural language list of photo descriptions.

Various embodiments of the present disclosure will be described with reference to the drawings below.

FIG. 1 is a diagram showing an electronic device for performing automated photography. The electronic device may include one or more neural networks to use artificial intelligence (AI) technologies.

As shown in FIG. 1, the electronic device may include a camera system 110, a processor 120, an input interface 130, a memory 140, a display 150, and a communication interface 160.

The camera system 110 may include a video camera 111 and a still camera 112. The functionalities of the video camera 111 and the still camera 112 are not restricted solely to capturing video and still images, respectively. Therefore, for simplicity, the video camera 111 and the still camera 112 may be referred to as a first camera and a second camera. The camera system 110 may be a part of a robot photographer. While FIG. 1 illustrates the camera system 110 as including both the video camera 111 and the still camera 112, the camera system 110 may include either the video camera 111 or the still camera 112. In embodiments of the present disclosure, the camera system 110 may incorporate only the video camera 111 with a capture function, such that while the video camera 111 is acquiring a video stream, the capture function may be activated to acquire still images. Additionally, the camera system 110 may include only the still camera 112, which captures still images upon receipt of an image snapping command. The image snapping command may be received from an external electronic device or be initiated through a user input. The external electronic device may be a server including or interoperating with a video camera, but the embodiments are not limited thereto.

The video camera 111 may be placed in a stationary position to record videos of areas where interesting moments occur. For example, the video camera 111 may be placed in a venue hosting a birthday celebration. The processor 120 interacting with the video camera 111 and/or the still camera 112 may be equipped with an on-device artificial intelligence (AI) algorithm to perform face recognition and object detection. The video camera 111 may learn to recognize faces of people, animals, and objects that appear in its field of view. The AI algorithm may be trained to identify visually interesting or important moments, for example, such as smiling faces, interactions between people and objects, or other actions that might be considered photo-worthy. Based on object recognition and understanding of what constitutes a good shot, the video camera 111 autonomously captures video frames when it detects a suitable moment. As the video camera 111 captures more moments and a user of the video camera 111 provides feedback (such as saving or deleting captured video clips) via the input interface 130, the AI algorithm continues to learn and refine its understanding of what moments are desirable to capture. Further, the camera system 110 equipped with the video camera 111 may include a motor or an actuator to change its position or orientation, based on a position of a scene or an object that the video camera 111 intends to capture.

The still camera 112 may automatically capture a still image, when an image snapping command is issued based on a video stream acquired by the video camera 111, and also based on interpretation of a user query including an event description. For example, when the processor 120 identifies a specific scene, such as a birthday person blowing out candles, within the video stream as a suitable moment to capture, the processor 120 may compute a similarity score between an image embedding extracted from the identified scene and a text embedding extracted from the user query. The processor 120 may send an image snapping command to the still camera 112 to capture the moment when the similarity score is greater than a predetermined threshold. The resulting image captured by the still camera 112 may offer an improved view and higher image resolution compared to the video stream.

The processor 120 may include a photo collection module 121, a photo selection module 122, an image processing module 123, a photo caption generation module 124, and a camera pose control module 125.

The photo collection module 121 may generate a camera control command using a large language model (LM) and a vision-language model (VLM), to control the still camera 112 to capture images at specific moments and in a specific pose. The vision-language model may include an image encoder and a text encoder, and for example, may be implemented as a Contrastive Language-Image Pretraining (CLIP) machine learning model. The camera control command may include an image snapping command which directs the still camera 112 to capture an image upon receipt of the image snapping command, and information of a pose of the video camera 111 and the still camera 112, such as an orientation, an angle, and/or a position of the video camera 111 and the still camera 112.

The photo collection module 121 may receive a user query including an event description (e.g., "I am going to a birthday party. Please list three types of photos I should take") of a target event (e.g., birthday party) through the input interface 130. The user query can be acquired via a physical or virtual keyboard 131, or through a microphone 132. In instances where the user query is conveyed as a voice signal, the processor 120 employs voice-to-text translation to convert the voice signal into textual data.

Once the user query is received, the photo collection module 121 may load and execute the language model which is stored in a local storage (e.g., the memory 140), or may access the language model that is stored in an external device (e.g., a server) through the communication interface 160. When the language model is stored in a server (e.g., a server 1620 shown in FIG. 16), the processor 120 (e.g., a processor 1611 shown in FIG. 16) may transmit the user query to the server through the communication interface 160, and may receive a language model response from the server through the communication interface 160. Examples of the language model include, but are not limited to Chat Generative Pre-trained Transformer (GPT), Bidirectional Encoder Representations from Transformers (BERT), and Text-to-Text Transfer Transformer (T5).

The photo collection module 121 may provide the user query as input to the language model, and may acquire one or more photoshoot suggestions as an output of the language model. The photoshoot suggestions may include suggestions for capturing the essence of the event, and may also be denoted as a "photo shot list" or "contextual photography ideas." For instance, if the input user query is "I am going to a birthday party. Please list three types of photos I should take," the language model may yield the following photoshoot suggestions: (1) A photo of the birthday person with their cake; (2) A photo of the birthday person opening their presents; and (3) A photo of the birthday person blowing out their candles.

The photo collection module 121 may use key event descriptors derived from images taken during the event as input to the language model, alongside the user query. The photo collection module 121 may also obtain key event descriptors from a voice signal recorded by a microphone 132 during the event. The term "key event descriptor" may refer to a piece of information or a characteristic that serves as an identifier or descriptor for a specific event. Key event descriptors may be used to categorize, differentiate, or provide context for an event. Key event descriptors may take various forms, including but not limited to textual descriptions, keywords, metadata, or specific attributes associated with an event.

When the voice signal is obtained, the processor 120 may perform a voice-to-text conversion process on the voice signal to acquire text from the voice signal. The photo collection module 121 may extract key event descriptors from the voice signal which is then used as input for the language model. In embodiments of the present disclosure, the photo collection module 121 may compare the text acquired from the voice signal with background information provided from a user for a specific photography event. The background information may include information about age, nationality, preferences, names of close friends and family members, and the like. The photo collection module 121 may identify semantic entities (e.g., words or phrases that represent objects, actions, or idea) within the text, which has a similarity (e.g., a cosine similarity) greater than a predetermined similarity threshold. The photo collection module 121 may use the semantic entities having the similarity greater than the predetermined similarity threshold as the key event descriptors for the specific photography event. The photo collection module 121 may construct a full query by combining the user query with key event descriptors extracted from the images. This allows the photo collection module 121 to capture an event concept that the user might not have explicitly mentioned in their query but was captured by the camera during the event.

To extract key event descriptors from the images, the photo collection module 121 may use or interoperate with a photo caption generation module 124. The photo caption generation module 124 may either be integrated within the photo collection module 121 or provided as a separate component. The photo caption generation module 124 incorporates an AI captioning model that utilizes a convolutional neural network (CNN) or a transformer-based architecture to extract image features from an input image. The AI captioning model may also use a recurrent neural network (RNN) or a transformer-based architecture to generate a caption that aligns with the extracted image features. However, the neural network structures for the photo caption generation module 124 and the AI captioning model are not limited to convolutional neural networks or transformer-based architectures, and various other neural network structures may be used to realize the embodiments described in the present disclosure.

For instance, when the video camera 111 captures an image of a clown at a child's birthday party, the photo caption generation module 124 generates a key event descriptor such as "clown" as an event concept, which corresponds to the image features from the image of the clown. This occurs even when the user query does not contain any terms related to "clown."

The photo collection module 121 may use the vision-language model to identify instances within the video stream acquired from the video camera 111 that merit capture by the still camera 112. To this end, the vision-language model may compute a similarity score between text features extracted from the photoshoot suggestions and image features extracted from the video stream. The similarity score may be used to quantify the similarity or relatedness between images and text, enabling retrieval of images that are relevant to the text contained within a user query. The similarity score is computed as one of the methods for measuring the similarity between images and text. The vision-language model may identify a moment having the similarity score that is greater than a predetermined threshold as a moment for capturing an image via the still camera 112. More specifically, when the photo collection module 121 obtains a video frame at a specific time (e.g., time $T_1$) and determines that the video frame has the similarity score exceeding the predetermined threshold, the photo collection module 121 may immediately initiate a timer set for a specific duration (e.g., a time duration from $T_1$ to $T_2$ or a time duration from $T_1+T_{delay}$ to $T_2$ when $T_{delay}$ denotes a delay for activating the still camera 112) and may capture images through the still camera 112 for the specific time duration. The computation of the similarity score may involve employing metrics such as cosine similarity or Euclidean distance to measure the correlation between the text features and the image features.

When the photo collection module 121 detects a moment having a similarity score greater than the predetermined threshold, the photo collection module 121 issues an image snapping command to the still camera 112 to enable the still camera 112 to capture an image upon receipt of the image snapping command. The photo collection module 121 may store the captured image in a photo collection database of the memory 140.

The photo selection module 122 may conduct a comparison between the event description provided in the user query and the images stored within the photo collection database. From this process, the photo selection module 122 may identify and select at least one image within the photo collection database as a corresponding match to the event description. Specifically, the photo selection module 122 may calculate a similarity score between the event description and the images, organize the images by ranking them from the highest similarity to the lowest similarity, and select at least one image based on this ranking. The selection can involve opting for a predetermined count of images according to their rank or choosing any images that exhibit similarity scores exceeding a predetermined threshold.

The image processing module 123 may perform image processing on the selected image to improve image quality. Subsequently, the image processing module 123 may provide the processed image to the display 150 for presentation to the user. In particular, the image processing module 123 may perform noise reduction (e.g., Gaussian blur, median filtering, and wavelet denoising), sharpening, contrast enhancement (e.g., histogram equalization, adaptive contrast stretching, and logarithmic transformation), color correction (e.g., white balance adjustment, color cast removal, and color histogram stretching), image resizing, deblurring, super-resolution, and artifact removal.

Figure 2:
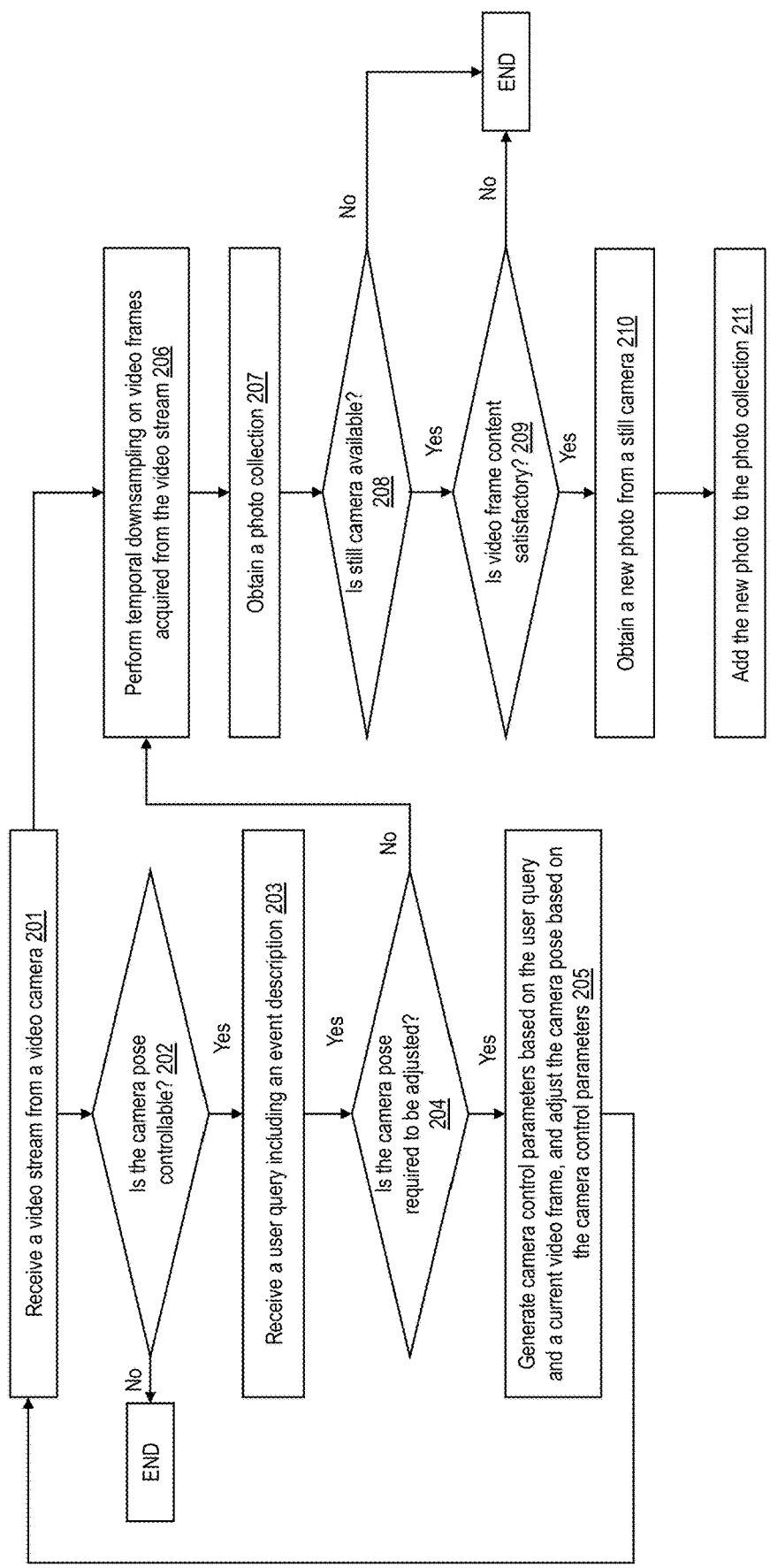
FIG. 2 is a flowchart illustrating a method of acquiring a photo collection according to one or more embodiments of the present disclosure.

FIG. 2 is a flowchart illustrating a method of acquiring a photo collection according to one or more embodiments of the present disclosure.

In operation 201, a video stream is received from a video camera.

In operation 202, assessment is conducted to determine whether a camera pose of the video camera is controllable. The camera pose may include a camera position, a camera orientation, and a camera angle or a field of view.

The camera position may refer to a physical location of the camera in a global coordinate system. The camera position may be specified as a three-dimensional (3D) point (x, y, z) in space, indicating where the camera is located in relation to the scene it is capturing. The camera orientation may refer to the direction in which the camera is pointing or facing, and may be represented as a rotation matrix that describes how the coordinate system of the camera is oriented relative to the global coordinate system. The camera orientation may determine the viewing direction of the camera and how the camera is aligned with the scene. The camera angle or field of view (FOV) may refer to the extent of the scene that the camera is capable of capturing in a single frame. The camera angle or field of view (FOV) may be measured as an angle, either horizontally, vertically, or diagonally, and may define the perspective of the camera. A wider angle captures more of the scene, while a narrower angle provides a more zoomed-in view. In other words, the camera pose encompasses the camera orientation (i.e., how the camera is pointing), the camera position (where the camera is located), and the field of view or angle (how much of the scene the camera can see).

In order to control the camera pose, an electronic device including the video camera may include a motor or an actuator that moves the camera to change the position and orientation of the video camera, along with sensors for providing feedback to the electronic device to ensure accurate control of the camera pose, and a control software program for processing sensor data and generating control signals for the motor or actuator. The sensors may include an encoder configured to measure the position of the motor or the actuator and provide feedback on how far the camera has moved or rotated, and an inertial measurement unit (IMU) configured to provide information about the camera orientation and acceleration. The IMU may include an accelerometer and a gyroscope. Further, the electronic device may include a user interface to allow a human operator or user to interact with the video camera to adjust the camera pose.

If it is determined in operation 202 that the camera pose can be controlled, the method may proceed to operation 203. If not, the camera pose control process can be terminated. Even if the camera pose of the video camera 111 is not controllable, the video camera 111 may continue operating to capture a video stream from either a fixed position or a user-manually adjusted position. Additionally, the still camera 112 may also operate to capture images from a fixed or adjusted position, even when the camera pose of video camera 111 is not controllable. The position of the still camera 112 may be adjusted either automatically or manually by the user.

In operation 203, a user query including an event description of a target event is received.

In operation 204, assessment is conducted to determine whether an adjustment to the current camera pose of the video camera is required, based on correlation between the user query and the received video stream. If the correlation falls below a predetermined threshold, a determination may be made that the camera pose is required to be adjusted to capture a scene or object more closely aligned with the event description. Otherwise, the video camera may retain its current camera pose to continue to record video images. In particular, the correlation between the user query and the video stream may be measured by obtaining a photoshoot suggestion from a language model in response to the user query, and calculating a cosine similarity between a text embedding derived from the photoshoot suggestion and an image embedding extracted from the current video frame within the received video stream.

If the camera pose is required to be adjusted, the method proceeds to operation 205, in which camera control parameters are generated to maximize the correlation between the user query and the video stream, and the camera pose is adjusted based on the camera control parameters. The camera control parameters may include a new camera position, a new camera orientation, and/or a new camera angle or a field of view.

When no adjustment to the camera pose is required, the method proceeds to operations 206 and 207 for acquiring a photo collection (also referred to as "a set of photos") using video frames extracted from the video stream. To reduce the data size of the photo collection, temporal downsampling may be applied to the video frames in operation 206 before adding them into the photo collection in operation 207.

Temporal downsampling of a video stream involves reducing the number of frames captured and stored over a given time period, effectively decreasing the frame rate, saving storage space, reducing data transmission bandwidth, or managing computational resources. For example, frame skipping, frame averaging, key frame selection, adaptive downsampling based on the content, and/or variable frame rate technologies may be applied for the temporal downsampling.

In operation 208, assessment is conducted to determine whether a still camera is available to snap or capture a specific scene or object.

In operation 209, a determination is made regarding whether a current video frame meets a target content criterion (i.e., the content of the current video frame is satisfactory), based on comparison between a natural language query derived from the user query and the current video frame. Specifically, when a cosine similarity between the natural language query and the current video frame is greater than a predetermined threshold in operation 209, it may signify that an noteworthy moment is unfolding, and an image snapping command may be sent to the still camera to capture the current moment in operation 210.

During operation 211, the image obtained from the still camera can be integrated into the photo collection. Specifically, the newly acquired image will undergo a comparison with the images already present in the photo collection. If the newly acquired image exhibits a higher cosine similarity with the images in the existing photo collection, it may be added to the photo collection.

As shown in FIG. 2, in a case where the still camera is unavailable, a photo selection process may be carried out solely using the video frames extracted from the video stream. However, when the still camera is available, the still camera may activated and triggered to acquire new images that capture the noteworthy moment detected within the current video frame. Subsequently, these newly acquired images are added into the photo collection, so that the best photos can be selected from the photo collection, including both the images acquired from the still camera and the video frames extracted from the video stream. Further details regarding the control of the still camera in accordance with operations 209-211 will be described with reference to FIG. 3.

Figure 3:
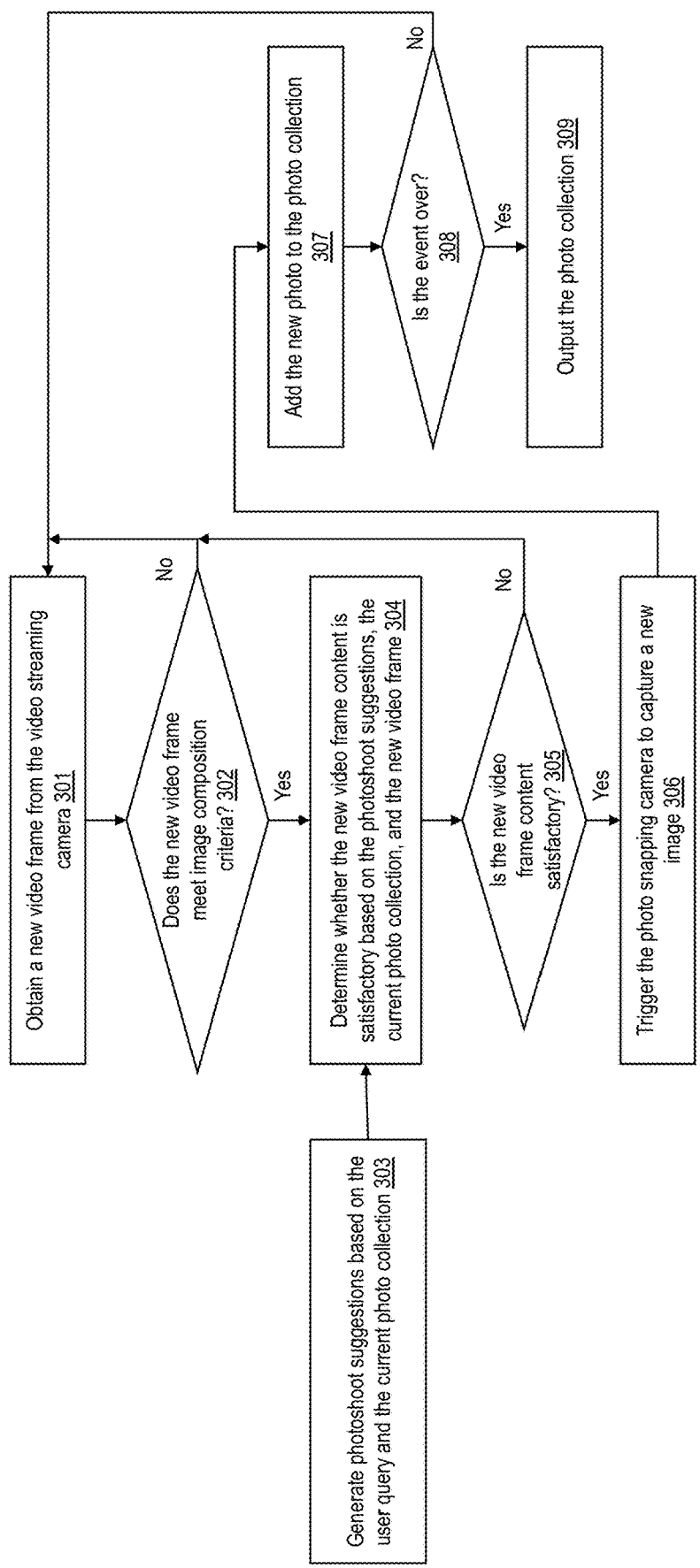
FIG. 3 is a flowchart illustrating a method of acquiring snapped photos based on a video stream, according to one or more embodiments of the present disclosure.

FIG. 3 is a flowchart illustrating a method of acquiring snapped photos based on a video stream according to one or more embodiments of the present disclosure. The method shown in FIG. 3 may correspond to operations 209-211 of FIG. 2.

If the camera pose of the video camera 111 is not controllable (operation 202 in FIG. 2), then a still camera controller may be operated as shown in FIG. 3.

During operation 301, a continuous stream of video is received through a video camera, with video frames being extracted in real-time as they are received. Upon obtaining a new video frame, which is also referred to as the "current video frame," operation 302 is initiated to assess whether this new frame complies with predetermined image composition criteria. The predetermined image composition criteria may include a rule of thirds which requires an image to be divided into nine equal parts by two equally spaced horizontal and vertical lines, a depth requirement that provides a sense of depth or perspective through techniques such as foreground framing, a contrast requirement, and the like.

In operation 303, one or more photoshoot suggestions are generated based on the user query including an event description as well as the images of the current photo collection. For instance, if the video camera captures an image (e.g., an image of a "clown") that deviates or is absent from the user query (e.g., "balloon") during the event, the photoshoot suggestion may draw inspiration from the broader event concept by utilizing information (i.e., key event descriptors) derived from the captured image, rather than solely relying on the user query. Key event descriptors may include activities (e.g., if event="wedding," then, photo_content="the bride putting the ring on the groom"), objectives (e.g., if event="birthday party," then photo_content="a pile of presents"), and natural phenomena (e.g., if event="dinner cruise," then "photo_content="sunset"). The term "activity" may refer to a specific action that is to be captured by a human or robot photographer to document a particular event.

Operation 304 involves evaluating the content of the new video frame through a comparison process to determine whether the content of the new video frame meets a target content criterion. This comparison entails assessing the match between the photoshoot suggestion and the images within the current photo collection and the new video frame. More specifically, the cosine similarity score is calculated for each of the new video frame and the images in the current photo collection in relation to the photoshoot suggestion. If the new video frame attains the highest cosine similarity score, it signifies that the content of the new video frame aligns most closely with the photoshoot suggestion and is deemed satisfactory.

In operation 305, if the content of the new video frame is determined to be satisfactory based on a comparison between text embeddings extracted from photoshoot suggestions and image embeddings extracted from existing images (e.g. video frames and still images within the photo collection) obtained prior to the new video frame during the ongoing photography event, as well as the new video frame, operation 306 is initiated to activate the still camera for capturing a new still image. Here, the term "new video frame" denotes a most recently acquired frame from an ongoing video stream captured by the video camera 111. An explanation of a criterion and a method used to assess the satisfaction of video frame content will be provided in further detail in reference to FIG. 4.

Subsequently, in operation 307, this new image may be integrated into the existing photo collection. These operations 301 to 307 will be iterated until a user input is received indicating that the event is finished, as denoted in operation 308. Once the event is finished, the photo collection is then output for the subsequent photo selection process in operation 309.

Figure 4:
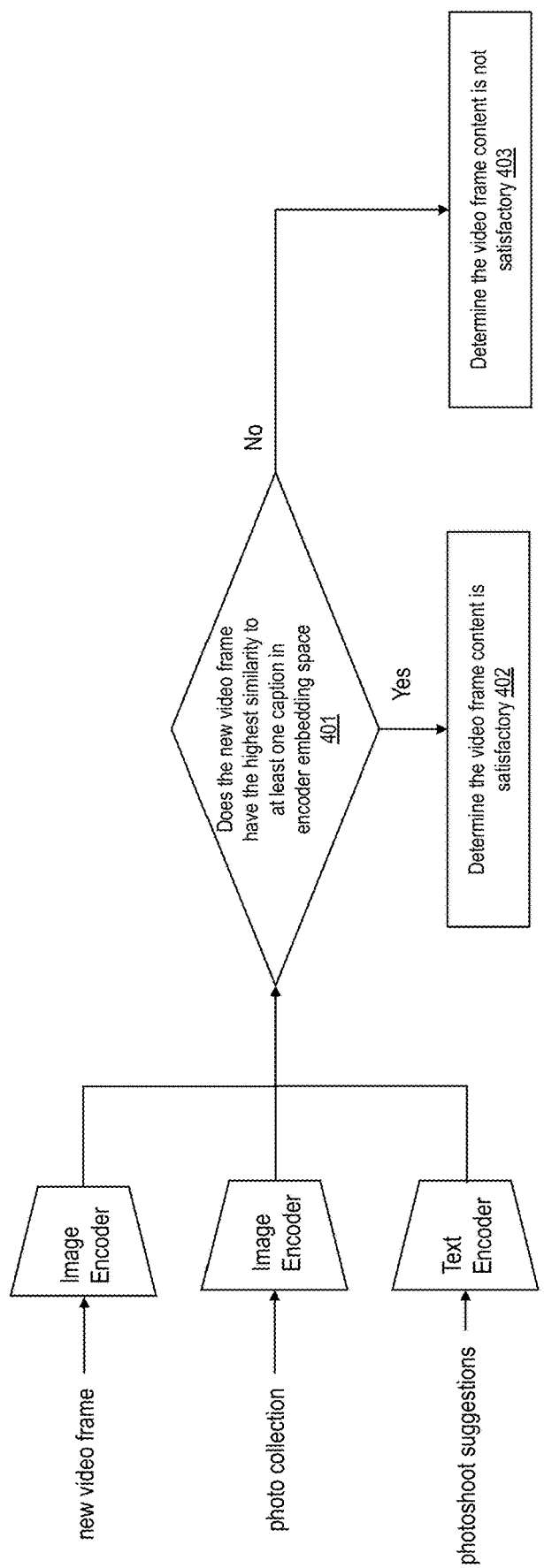
FIG. 4 is a flowchart illustrating a method of determining whether a video frame satisfies a target content criterion, according to one or more embodiments of the present disclosure.

FIG. 4 is a flowchart illustrating a method of determining whether a new video frame satisfies a target content criterion, according to one or more embodiments of the present disclosure. The method shown in FIG. 4 may correspond to operations 304 and 305 of FIG. 3.

Referring to FIG. 4, an image embedding vector $I_1$ of a new video frame and image embedding vectors $I_2, I_3, \ldots, I_n$, of images included in the photo collection are obtained through an image encoder, and text embedding vectors $T_1$, $T_2, \ldots, T_n$ of photoshoot suggestions are acquired through a text encoder.

The image encoder and the text encoder may be integral components of a Contrastive Language-Image Pretraining (CLIP) machine learning model that processes images and text together in a unified framework, which is referred to as a joint embedding space.

The image embedding vectors $I_1, I_2, \ldots, I_n$ and the text embedding vectors $T_1, T_2, \ldots, T_n$ are projected into a joint embedding space to compute similarity scores between each of the image embedding vectors $I_1, I_2, \ldots, I_n$ and each of the text embedding vectors $T_1, T_2, \ldots, T_n$. In operation 401, if the image embedding vector $I_1$ of the new video frame exhibits the highest similarity (e.g., the highest cosine similarity score or the shortest Euclidean distance) to at least one of the provided photoshoot suggestions, it is considered satisfactory and meets a target content criterion. In response, an image snapping command is executed in operation 402 to prompt the still camera to capture a new image. Conversely, if the new video frame does not achieve the highest similarity, the new video frame is deemed unsatisfactory and does not meet the target content criterion, and as a result, no image snapping command is issued to the still camera in operation 403.

According to embodiments of the disclosure, among the image and text embeddings generated by the image encoder and the text encoder, embeddings with significant element values (e.g., magnitudes exceeding a predefined threshold of 0.3) may be zeroed out. Subsequently, the embeddings may undergo normalization, effectively mitigating the impact of undesirable frames.

Figure 5:
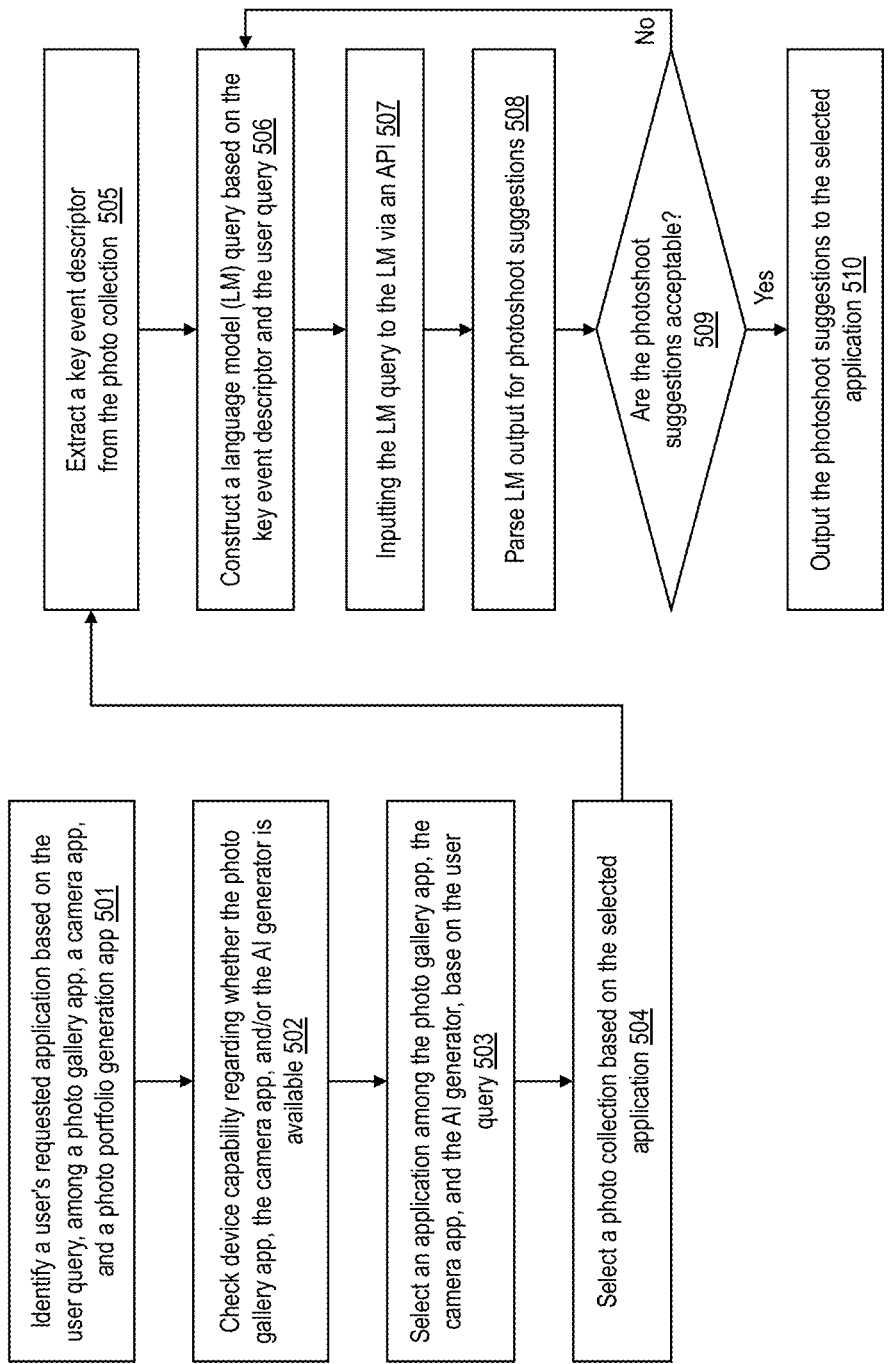
FIG. 5 is a flowchart illustrating a method of acquiring photoshoot suggestions using a large language model according to one or more embodiments of the present disclosure.

FIG. 5 is a flowchart illustrating a method of acquiring photoshoot suggestions using a language model according to one or more embodiments of the present disclosure. The method shown in FIG. 5 may correspond to operation 303 of FIG. 3.

In operation 501, an electronic device may identify a user's requested application among a photo gallery application, a camera application, and an AI-based photo portfolio generation application, based on a user query. The user query may include a command which describes what the user intends to do, such as "Capture wedding photos" for the camera application, "Generate a wedding photo portfolio" for the photo gallery application or the photo portfolio generation application, or "Search for wedding photos" when using the photo gallery application. Additionally, the user query may contain an event description, encompassing details about the event, including activities (e.g., the user's input of "the bride placing the ring on the groom"), objects (e.g., the user's input of "a stack of presents"), and natural phenomena (e.g., the user's input of "sunset") associated with the event. The inclusion of the command and event description in the user query may be mandatory. Optionally, the user query may also include background information, such as details known to the user from previous interactions (e.g., age, nationality, preferences, names of close friends and family members, etc.), as well as face detection information (e.g., images facilitating the automatic photography system in associating names with faces). The electronic device may use natural language understanding (NLU) techniques to analyzes semantics and context of the command within in the user query. The electronic device may identify a target application that the user intends to use in association with the user query. Once the electronic device identifies the target application, the electronic device sends a command to the operating system of the electronic device to launch the target application.

In operations 502 and 503, the electronic device may assess its capabilities to determine whether the electronic device can execute the user's selected application. Based on the user query and the device's capabilities, an application is chosen, among the photo gallery application, the camera application, and the photo portfolio generation application.

In operation 504, the electronic device then determines the source of the photo collection based on the selected application. If the photo gallery app is chosen, the electronic device may use images already stored in the local storage of the electronic device as the photo collection. If the camera application is selected, the electronic device initiates image capture using its built-in video camera and/or still camera. These newly captured images are stored in the local storage and become the photo collection. If the photo portfolio generation application is selected, the electronic device may access the pre-stored images and/or newly captured images from the local storage. Alternatively, the electronic device may acquire images from an external memory source to generate a photo portfolio.

When the AI-based photo portfolio generation application is activated, the electronic device may omit an image capturing process and a camera control process, and may perform a photo portfolio generation process using an image generation model, which will be discussed in detail later.

In operation 505, a key event descriptor is extracted from the photo collection. The extraction of the key event descriptor is conducted to ensure that any pertinent concept observed during deployment of automatic photography is not overlooked, even if it was not explicitly mentioned in the user query. For instance, if a camera captures an image of a clown at a child's birthday party, an automatic photography system according to embodiments of the present disclosure dynamically adjusts its content selection to include the clown as a key event descriptor, even when the user did not specifically mention it. Additionally, a voice signal is captured during the event using a microphone, and a key event descriptor may be extracted from the voice signal. For instance, when the microphone records a voice utterance such as "Mike, come over here," the name "Mike" may be extracted as a key event descriptor. Subsequently, the automatic photography system may be directed to take a photograph of the individual named "Mike" by employing a facial detection algorithm in conjunction with a database containing individuals' names linked to facial images. Details of the extraction of the key event descriptor will be described with reference to FIG. 6.

In operation 506, a language model query is constructed using the extracted key event descriptor and the user query including an event description.

In operation 507, the language model query is input to the language model via an application programming interface (API). When the language model operates on an external server accessible via a web browser, the language model query may be entered into an input field within the web browser.

In operation 508, a language model output may be used as photoshoot suggestions or may be parsed to generate photoshoot suggestions.

In operation 509, an assessment is made to determine if the photoshoot suggestions meet predetermined criteria. If the photoshoot suggestions do not meet the criteria, operations 506-508 may be repeated to obtain new photoshoot suggestions.

If the photoshoot suggestions are acceptable, they are then forwarded to the selected application in operation 510 to proceed with further processing.

Figure 6:
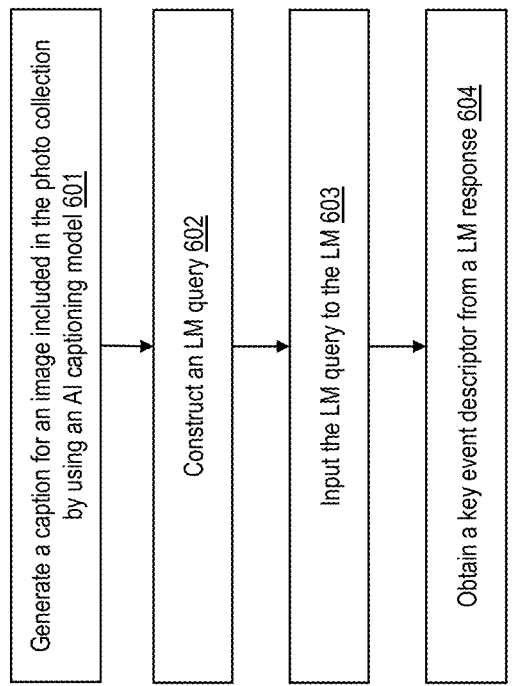
FIG. 6 is a flowchart illustrating a method of acquiring a photo concept through performing key event descriptor extraction on a photo collection according to one or more embodiments of the present disclosure.

FIG. 6 is a flowchart illustrating a method of acquiring a photo concept through the extraction of a key event descriptor from a photo collection according to one or more embodiments of the present disclosure. The method shown in FIG. 6 may correspond to operation 505 of FIG. 5.

In operation 601, image captions are obtained from the images within the photo collection using an AI captioning model, which employs a combination of computer vision and natural language processing techniques.

After the images from the photo collection are fed into the AI captioning model, the AI captioning model utilizes a convolutional neural network (CNN) or a transformer-based architecture to extract image features from the input images. These extracted features are referred to as image embeddings.

Subsequently, the AI captioning model uses its internal language model, which can be implemented using a recurrent neural network (RNN) or a transformer-based architecture, in order to generate a caption. This language model may grasp the context of the input image and generate a coherent and contextually relevant caption in the form of a word sequence. Finally, the AI captioning model outputs this generated caption, which provides a natural language description of the content within the input image. In embodiments of the disclosure, all the generated captions may be selected for creating a language model query, or alternatively, some of the captions that are relevant to the user query may be selected for creating a language model query.

Based on the captions acquired in operation 601, operation 602 is carried out to formulate a language model query based on these captions and the user query, which includes the event description. This language model query is intended for inputting to a large language model, such as ChatGPT or BERT, to obtain photoshoot suggestions.

Figure 7A:
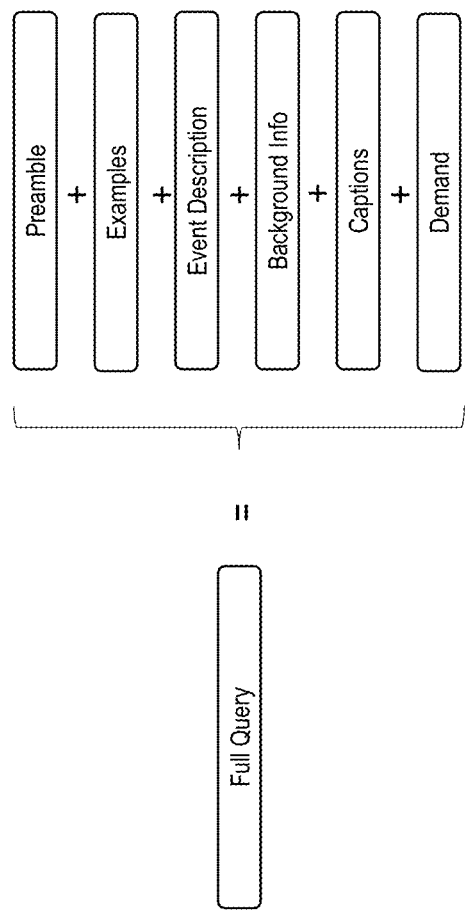

FIGS. 7A and 7B illustrate a language model query structure for acquiring a key event descriptor, and an example fully query for acquiring a key event descriptor, respectively, according to one or more embodiments of the present disclosure.

As shown in FIG. 7A, a language model query may be constructed to include a preamble field, an example field, an event description field, a background information field, a caption field, and a demand field.

The preamble field clarifies the task for the language model. The example field offers a model function as an illustrative reference. The event description field contains a user-provided event description. The background information field includes background information provided by the user. The caption field includes image captions generated by the AI captioning model. The demand field provides instructions to guide the language model's output.

Some fields (e.g., the preamble field, the event description field, the caption field, and the demand field) may be mandatory, while others are considered optional. These fields within the language model query can be linked or merged through string concatenation.

As shown in FIG. 7B, an exemplary full language model query for acquiring a key event descriptor from a large language model, may include a preamble delineating a task assigned to a robot photographer. The language model query may also include examples illustrating the proper execution of various tasks for different events, an event description derived from a user query, captions generated by observing the photo collection through video stream analysis. The language model query may incorporate a demand field to request the language model to identify a key event descriptor based on the information provided in the language query.

Referring back to FIG. 6, in operations 603 and 604, the language model query is input into the language model, and a key event descriptor is obtained from a response of the language model.

Figure 8:
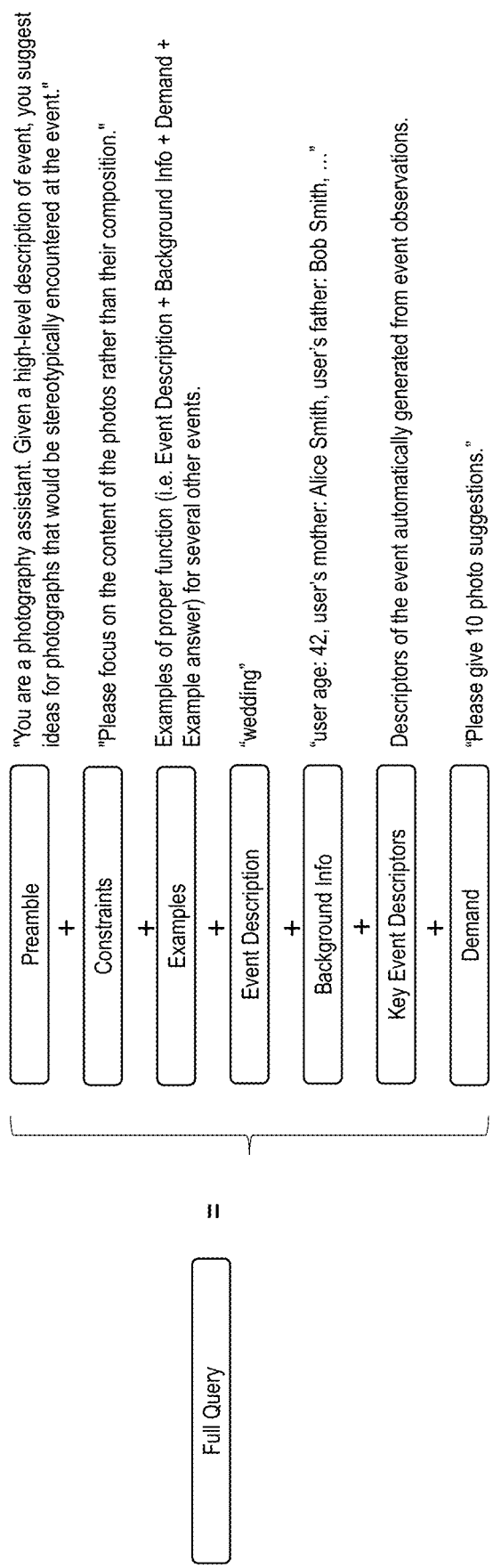
FIG. 8 illustrates a language model query structure for acquiring photoshoot suggestions according to one or more embodiments of the present disclosure.

FIG. 8 illustrates a language model query structure for acquiring photoshoot suggestions according to one or more embodiments of the present disclosure.

As depicted in FIG. 8, the language model query may be constructed to include a preamble field, a constraint field, an example field, an event description field, a background information field, a key event descriptor field, and a demand field.

The preamble field clarifies a photography task for the language model. The constraint field includes a photography directive instructing the robot photographer to abstain from certain actions. The example field offers a model function as an illustrative reference. The event description field contains a user-provided event description. The background information field includes background information provided by the user. The key event descriptor field includes event descriptors that have been automatically generated from event observations through operations 601-604. The demand field provides instructions to guide the language model's output.

Query phrases that encompass composition descriptions, such as "close up" and "wide shot," have the potential to yield less optimal photo selections. Consequently, the language model is directed to prioritize content over composition or to disregard any phrase combinations related to photography compositions, including "close-up," "closeup," "close up," and "wide shot," through the constraint field in the language model query.

Figure 9:
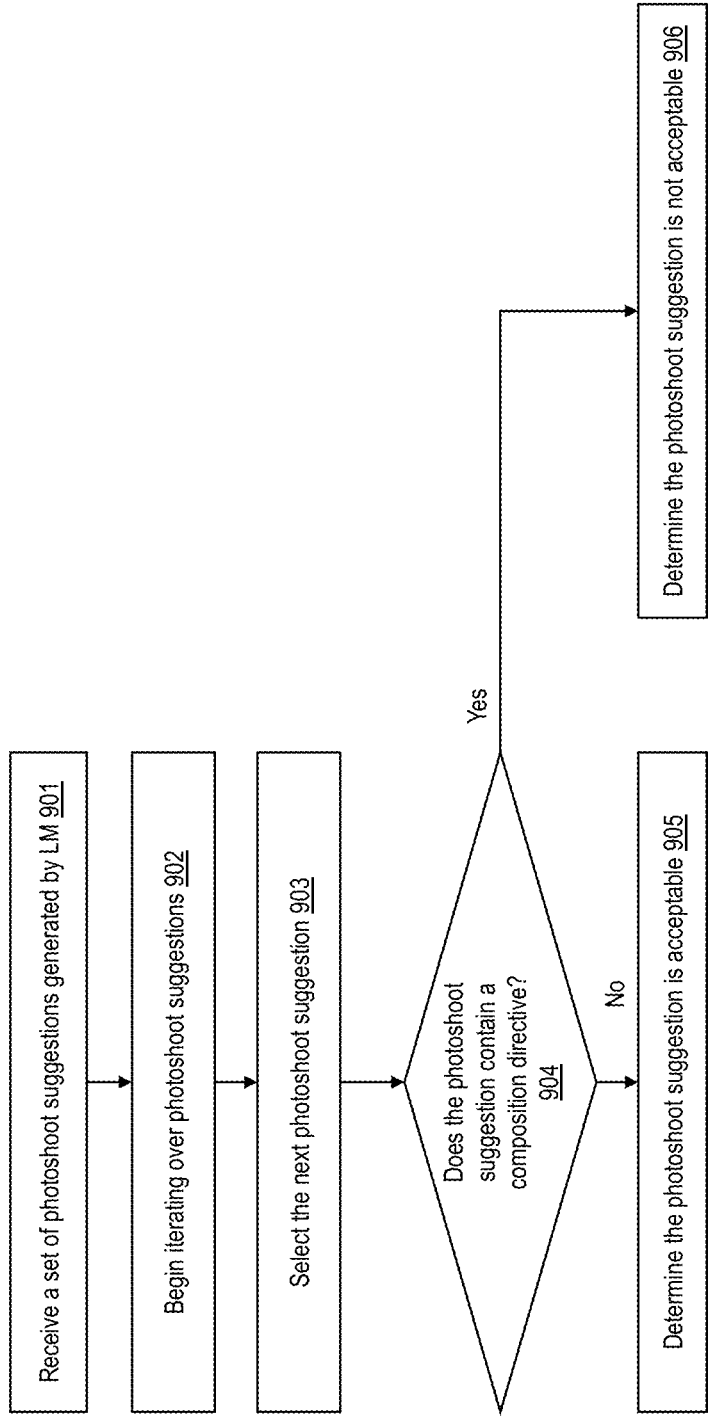
FIG. 9 is a flowchart illustrating a method of evaluating photoshoot suggestions, according to one or more embodiments of the present disclosure.

FIG. 9 is a flowchart illustrating a method of evaluating photoshoot suggestions, according to one or more embodiments of the present disclosure.

In operation 901, a set of photoshoot suggestions that are generated by the language model is acquired.

In operation 902, evaluation of the photoshoot suggestions is initiated.

In operation 903, a photoshoot suggestion is selected from the set of photoshoot suggestions at a time for the evaluation.

In operation 904, for the selected photoshoot suggestion, it is determined whether the selected photoshoot suggestion contains a composition directive, such as close-up," "closeup," "close up," and/or "wide shot." If the selected photoshoot suggestion does not contain any composition directive, the selected photoshoot suggestion is determined to be acceptable and is provided to robot photographer in operation 905. Conversely, if the selected photoshoot suggestion contains a composition directive, the selected photoshoot suggestion is determined to be unacceptable, and is discarded in operation 906.

Operations 903 and 904 are repeated iteratively until all the photoshoot suggestions have been evaluated.

Figure 10:
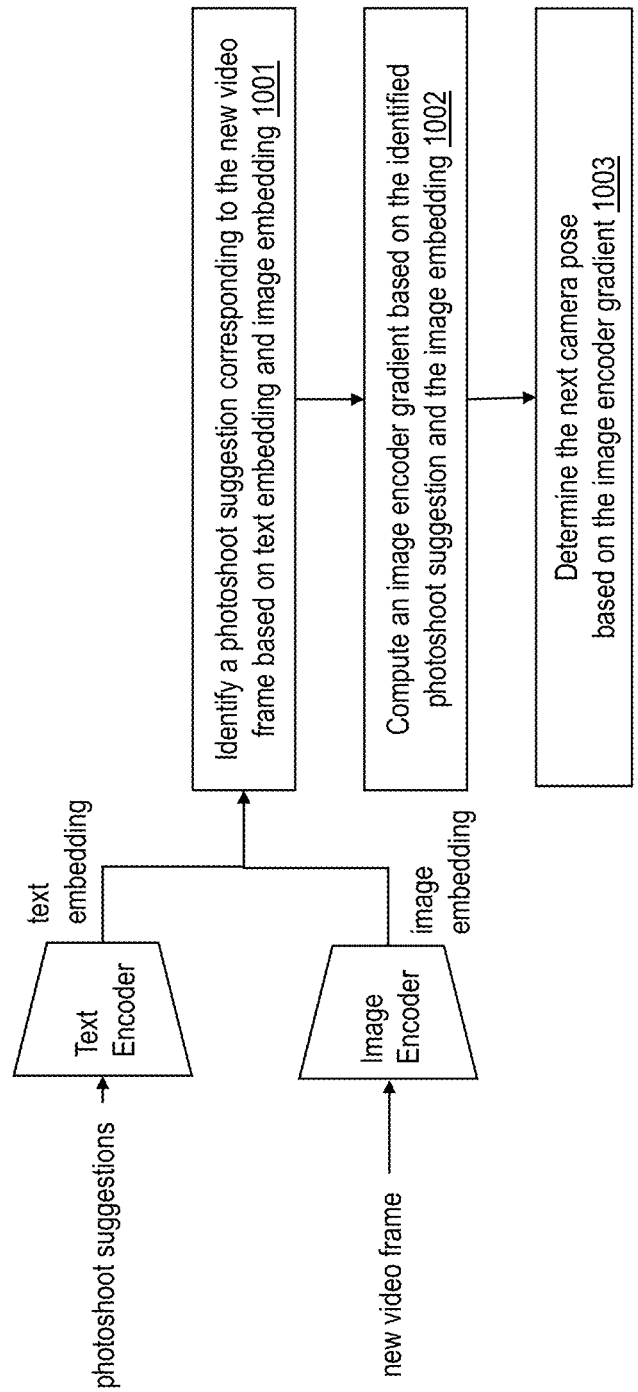
FIG. 10 is a flowchart illustrating a method of controlling a camera pose, according to one or more embodiments of the present disclosure.

FIG. 10 is a flowchart illustrating a method of controlling a camera pose, according to one or more embodiments of the present disclosure.

As shown in FIG. 10, a text encoder and an image encoder may be used to control the camera pose of the video camera and/or the still camera. The image encoder and the text encoder may be integral components of a Contrastive Language-Image Pretraining (CLIP) machine learning model that processes images and text together in a unified framework, which is referred to as a joint embedding space. The text encoder may be embodied using a convolutional neural network (CNN) or a transformer-based architecture, and the image encoder may be implemented using a recurrent neural network (RNN) or a transformer-based architecture. For instance, the poses of the video camera and the still camera are automatically adjusted based on camera control parameters generated using the text encoder and the image encoder. Alternatively, it is possible to solely automate the adjustment of the pose of the video camera while providing user guidance to the still camera so that the user manually changes the pose of the still camera based on the provided user guidance.

After obtaining a plurality of photoshoot suggestions from the language model, these photoshoot suggestions are processed through the text encoder to extract text features. The text encoder outputs text embedding vectors $T_1$, $T_2, \ldots, T_n$ that represent the text features extracted from the plurality of photoshoot suggestions.

When a new video frame (i.e., a current video frame) is captured from the ongoing video stream at the current moment, it is introduced into the image encoder to extract image features from this new video frame. Consequently, the image encoder outputs an image embedding vector/that represent the image features extracted from the new video frame.

In operation 1001, a photoshoot suggestion corresponding to the current video frame is identified from the plurality of photoshoot suggestions, by computing a cosine similarity score between each of the text embedding vectors $T_1$, $T_2, \ldots, T_n$ and the image embedding vector I. For example, when the text encoder outputs text embedding vectors $T_1$, $T_2$, $T_3$ that represent three photoshoot suggestions such as "birthday cake," "blowing candles," and "opening presents," a first cosine similarity score between the text embedding vector T 1 and the image embedding vector I, a second cosine similarity score between the text embedding vector $T_2$ and the image embedding vector I, and a third cosine similarity score between the text embedding vector $T_3$ and the image embedding vector/are computed. If the third cosine similarity score is greater than the first and the second cosine similarity scores, the photoshoot suggestion "opening presents" is identified as the one followed by the robot photographer to capture the current video frame.

While in the current pose, the robot photographer initializes a counter and then subtracts the counter from the highest similarity score associated with the identified photoshoot suggestion while incrementing the counter over time. This gradual increase of the counter leads to a decrease in the highest similarity score over time. As the highest similarity score for the identified photoshoot suggestion decreases with time, a second photoshoot suggestion with the second-highest similarity score gradually becomes the one with the highest similarity score. This second photoshoot suggestion is then chosen to guide the camera pose adjustment for capturing an image corresponding to the second photoshoot suggestion. Operation 1001 will be further described with reference to FIG. 12 later.

In operation 1002, an image encoder gradient is computed based on the selected photoshoot suggestion and the image embedding. Specifically, the gradient of the image encoder is used to ascertain which changes to the input images are inclined to increase similarity between the input images and the selected photoshoot suggestion. In other words, changes to the input images that maximize their similarity to the selected photoshoot suggestion, are identified. Subsequently, a camera pose control command that causes the changes to the input images, is computed.

For example, a gradient-weighted class activation mapping (GradCAM) model may be applied to compute the gradient of the image encoder. The GradCAM may use a convolutional neural network (CNN) including a plurality of layers of convolutional and pooling operations followed by fully connected layers. An input image is fed into the GradCAM model, and a class activation map is output from the GradCAM model. The class activation map may highlight the regions of the input image that are most relevant to a predicted class (e.g., an object or a scene corresponding to the selected photoshoot suggestion), and may be also referred to as a heatmap.

The heatmap is generated using gradient information flowing back from a final classification layer of the GradCAM model. The gradient information may refer to the derivative or slope of an output of the image encoder with respect to changes in input images, and may indicate how the image representation of the image encoder changes when the input image is altered. The process of generating the heatmap includes inputting the image embedding to the GradCAM model, computing a target class score for a target class, and computing the gradient of the target class score with respect to a feature map output from the final classification layer. The gradient information represents how sensitive the class score is to changes in the feature map. The heatmap may be overlaid onto the original input image to visually highlight the regions which contributed the most to the classification decision for the target class, on which the model focused on when making its classification decision.

When an image is fed into the GradCAM model, the GradCAM model generates a heatmap that highlights specific regions within the image associated with a particular classification. To illustrate, if the model is tasked with classifying an image as "cake" based on a photoshoot suggestion, the resulting heatmap will pinpoint the area within the image that represents the object corresponding to "cake."

In operation 1003, a next camera pose is determined based on the gradient information. Specifically, the center of a region of interest (ROI) is identified from the heatmap, and the gradient information is calculated to track how the center of the images shifts with respect of the center of the ROI as the camera continuously captures new images, resulting in changes to the input images to the image encoder. A robot control command is generated based on the gradient information to guide the adjustment of the camera's position and orientation (rotation). The camera can move forward, backward, left, or right toward the center of the ROI. If the ROI is located to the right of the frame, the camera will adjust its rotation to the right to ensure proper framing. Continuously capturing and analyzing image frames, the camera utilizes the heatmap or the gradient information as feedback to iteratively refine its position and orientation until the center of the ROI matches the center of the image. A camera control algorithm may be used to translate the heatmap or the gradient information into a camera control command for controlling movement and orientation of the camera. The camera control command may include a translation vector or a translation matrix representing translations along the x-axis, y-axis, and z-axis, and a rotation vector or a rotation matrix indicating rotations around the x-axis, y-axis, and z-axis (i.e., pitch, yaw, and roll, respectively). The camera control algorithm is executed to minimize the discrepancy between the desired framing and the current camera view.

Figure 11:
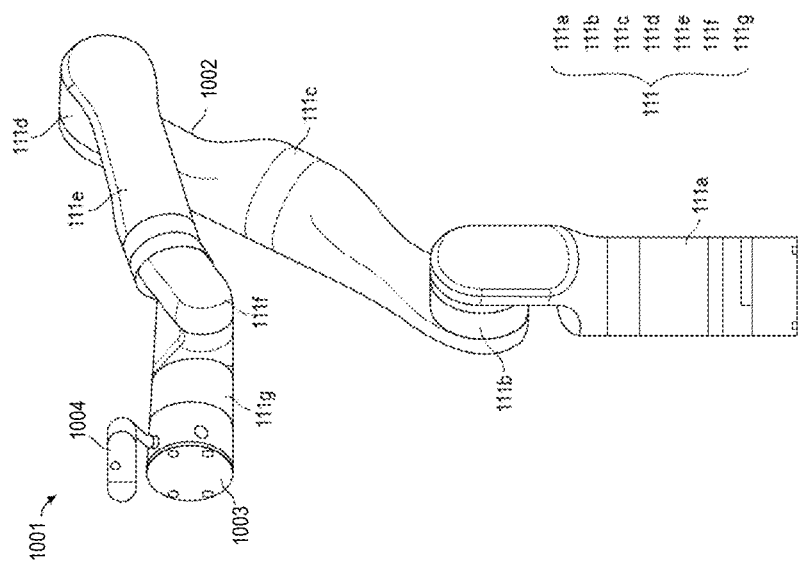
FIG. 11 illustrates a robot photographer including a camera according to one or more embodiments of the present disclosure.

FIG. 11 illustrates a robot photographer including a camera according to one or more embodiments of the present disclosure.

As shown in FIG. 11, a robot photographer 1001 includes a robot arm 1002 having a manipulator 1003 and a vision sensor 1004 positioned at one end thereof.

The robot arm 1002 may be operated under the control of the processor 120 (see FIG. 1) to capture target objects and scenes suggested in photoshoot suggestions. In embodiments, the robot arm 1002 may include one or more joints 111. For example, the joints 111 may include a joint 111a, a joint 111b, a joint 111c, a joint 111d, a joint 111e, a joint 111f, and a joint 111g, each of which may be located at different positions along the robot arm 1002. In embodiments, the robot arm 1002 may move the manipulator 1003 to a desired position in space by rotating, moving, or otherwise operating at least one of the joints 111. For example, the robot control algorithm may compute joint angles or velocity commands for controlling the joints 111 which may cause the vision sensor 1004 to be moved to a particular position, and the robot arm 1002 may rotate the joints 111 according to the calculated joint angles or velocity commands.

The vision sensor 1004 may include one or more cameras (e.g., the video camera 111 and/or the still camera 112), and may be configured to capture images of a target event according to photoshoot suggestions. For example, in embodiments the vision sensor 1004 may be attached to the robot arm 1002 such that the vision sensor 1004 is located at a fixed position with respect to the manipulator 1003, and therefore the vision sensor 1004 may be moved by the robot arm 1002 along with the manipulator 1003 according to the movements of the joints 111. The vision sensor 1004 may be attachable to or detachable from the manipulator 1003. For example, the manipulator 1003 may be equipped with a camera holder where a user can position their smartphone to function as the vision sensor 1004.

The robot photographer 1001 may capture images via the vision sensor 1004 while the robot photographer 1001 changes its pose to maximize the similarity between the captured images and a selected photoshoot suggestion based on the gradient of the image encoder.

Figure 12:
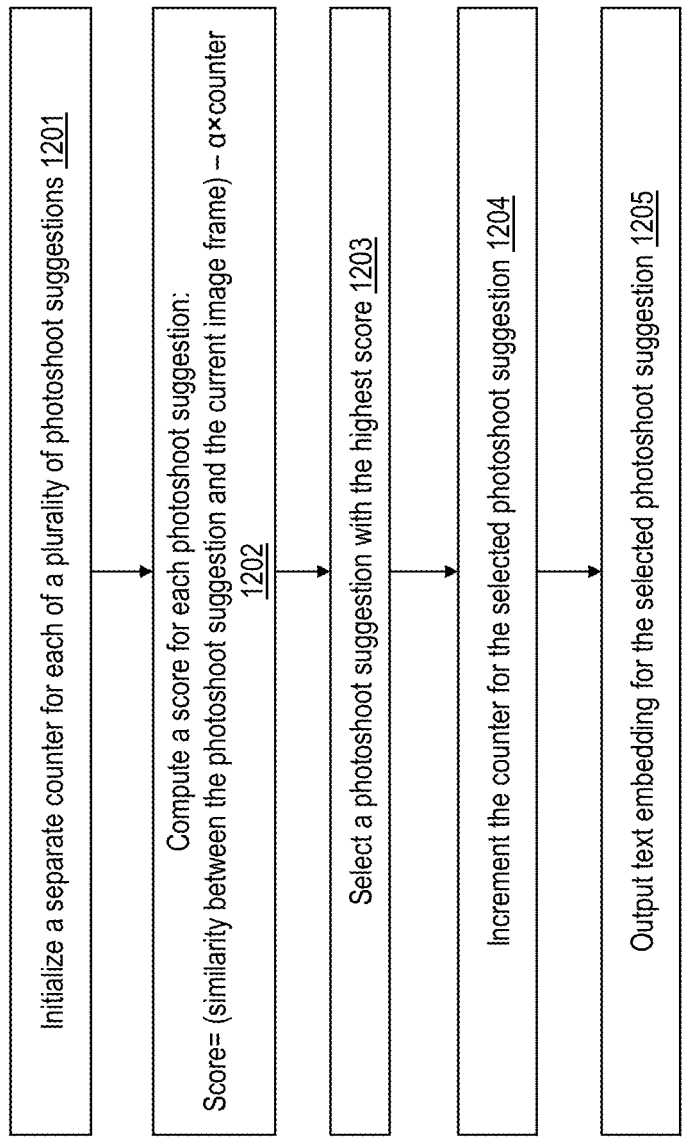
FIG. 12 is a flowchart illustrating a method of controlling a camera pose according to a selected photoshoot suggestion, according to one or more embodiments of the present disclosure.

FIG. 12 is a flowchart illustrating a method of controlling a camera pose according to a selected photoshoot suggestion, according to one or more embodiments of the present disclosure.

The method depicted in FIG. 12 is undertaken to identify, among a plurality of photoshoot suggestions, a specific photoshoot suggestion that the robot photographer is currently adhering to in order to capture an image. Additionally, the method is conducted to adjust the pose of the robot photographer to capture an image corresponding to a different photoshoot suggestion after remaining in the same pose for a predetermined duration. This method ensures that the robot photographer does not exclusively focus its efforts on capturing images associated with a single event concept.

In operation 1201, a counter is initialized for each of a plurality of photoshoot suggestions.

In operation 1202, a score for each of the plurality of photoshoot suggestions is computed as follows:

$$\text{Score} = \text{similarity between a photoshoot suggestion and a current image frame} - \alpha \times \text{counter}$$

Wherein α denotes a predetermined hyperparameter.

In operation 1203, the photoshoot suggestion with the highest score is selected from the plurality of photoshoot suggestions. In this context, the one with the highest score represents the specific suggestion that the robot photographer adhered to when capturing the image, subsequently processed through the image encoder for the similarity calculation.

In operation 1204, the photoshoot suggestion that the robot photographer is deemed to have followed is chosen for countdown. Specifically, the counter associated with the selected photoshoot suggestion is gradually incremented over time, causing the score for this photoshoot suggestion to decrease progressively. Consequently, the photoshoot suggestion with the second highest score gradually ascends to become the one with the highest score, ultimately being selected as the subsequent photoshoot suggestion.

In operation 1205, the text embedding for the selected photoshoot suggestion is output.

Figure 13:
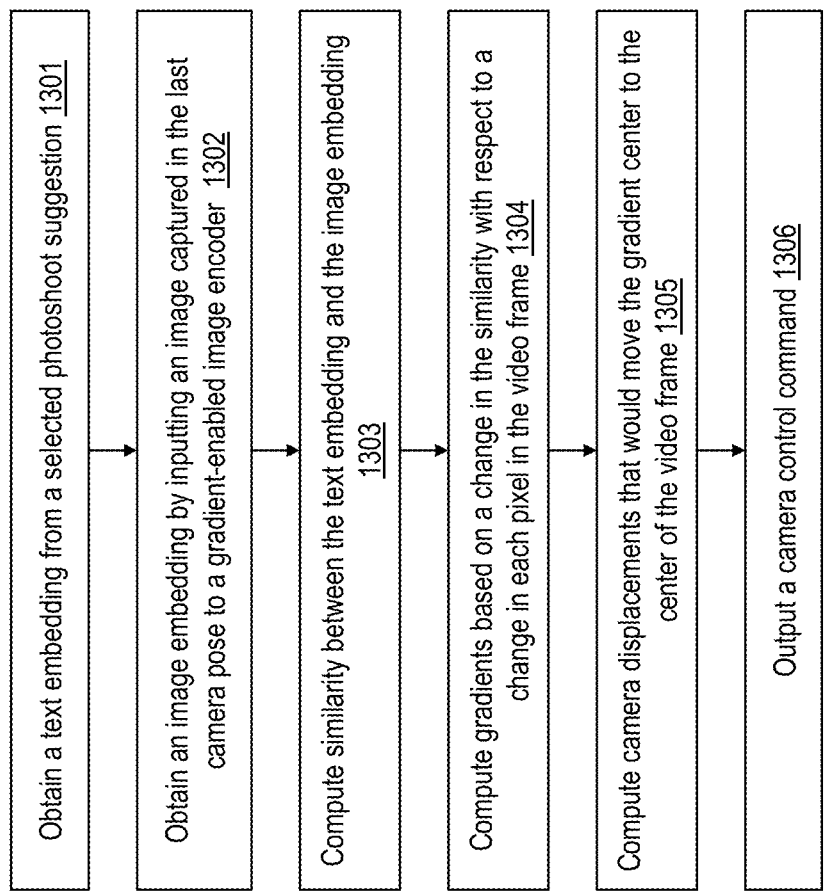
FIG. 13 is a flowchart illustrating a method of controlling a camera pose utilizing an image encoder with an enabled gradient function, according to one or more embodiments of the present disclosure.

FIG. 13 is a flowchart illustrating a method of controlling a camera pose with an enabled gradient function of an image encoder, according to one or more embodiments of the present disclosure. The method shown in FIG. 13 may correspond to operations 1002 and 1003 in FIG. 10.

In operation 1301, a text embedding is generated from a selected photoshoot suggestion selected among a plurality of photoshoot suggestions. The selected photoshoot suggestion represents a specific guideline followed by the robot photographer to capture an image.

In operation 1302, an image embedding is obtained by inputting the image that is captured in the last camera pose to the image encoder, with a gradient function of the image encoder enabled.

In operation 1303, the similarity between the text embedding and the image embedding is computed. This similarity measurement can be expressed as a cosine similarity score or calculated using the Euclidean distance.

In operation 1304, gradients are computed with backpropagation based on changes in similarity with respect to changes in each pixel within the image. For example, Δ(cosine similarity)/Δ(each pixel in the image) is calculated to obtain the gradient.

In operation 1305, camera displacements that would move the center of the gradients to the center of the image are computed.

In operation 1306, a camera control command including the camera displacements may be output to the robot photographer or may be displayed as a user guidance for controlling the camera. The camera control commands may include camera pose parameters such as translation coordinates (e.g., x, y, and z coordinates) and rotation angles (e.g., pitch, yaw, and roll angles) of the camera mounted on the robot photographer. Alternatively, the camera control command may be presented as user guidance which assists the user in adjusting the camera pose based on the provided camera displacements. Specifically, the electronic device may display a user guidance interface to instruct the user on how to manipulate the camera pose in response to the camera control command. For example, the user guidance interface may display graphical elements, such arrows, that indicate a direction in which the camera should be adjusted. Additionally, the user guidance interface may dynamically change a size and a shape of the graphical elements according to translation coordinates. When the camera control command requires an upward movement of the camera by 20 cm, the user guidance interface may display an upward-pointing arrow and may gradually reduce the length of the arrow as the camera follows a specified upward trajectory as per the camera control command. The graphical elements of the user guidance interface may be superimposed onto a camera preview image or positioned within a separate section of the display screen that does not overlap with the camera preview image.

Figure 14:
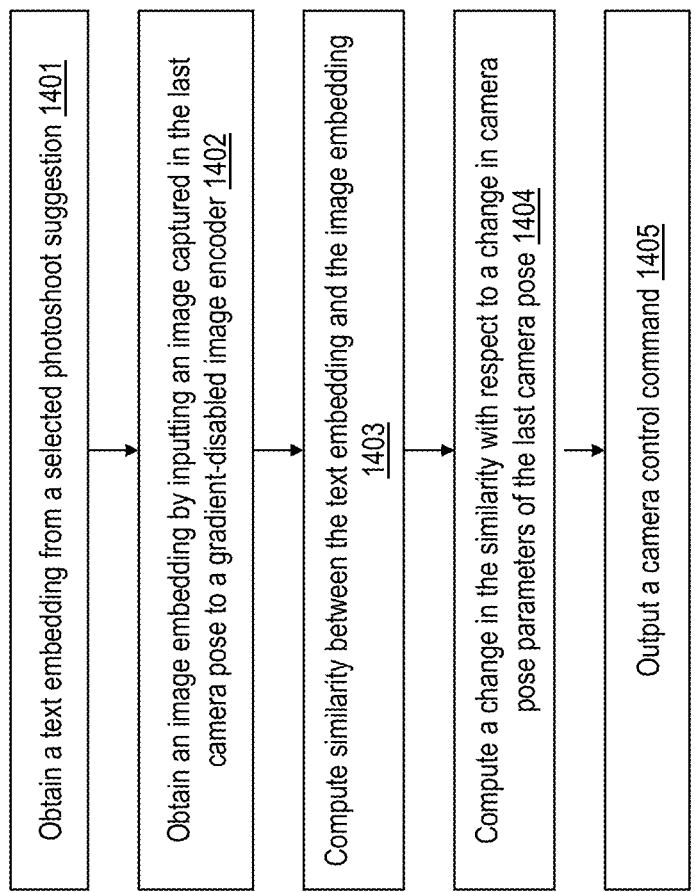
FIG. 14 is a flowchart illustrating a method of controlling a camera pose utilizing an image encoder with a disabled gradient function, in accordance with one or more embodiments of the present disclosure.

FIG. 14 is a flowchart illustrating a method of controlling a camera pose utilizing an image encoder with a disabled gradient function, in accordance with one or more embodiments of the present disclosure. The method shown in FIG. 14 may use a numerical difference to steer the image encoder.

In operation 1401, a text embedding is generated from a selected photoshoot suggestion selected among a plurality of photoshoot suggestions. The selected photoshoot suggestion represents a specific guideline followed by the robot photographer to capture an image.

In operation 1402, an image embedding is obtained by inputting the image that is captured in the last camera pose to the image encoder, with a gradient function disabled.

In operation 1403, the similarity between the text embedding and the image embedding is computed. This similarity measurement can be expressed as a cosine similarity score or computed using the Euclidean distance.

In operation 1404, changes in the similarity with respect to changes in camera pose parameters of the camera pose is computed, wherein the camera pose parameters may include translation coordinates (e.g., x, y, and z coordinates) and rotation angles (e.g., pitch, yaw, and roll angles) of the camera. For example, $\Delta(\text{cosine similarity})/\Delta(\text{camera pose parameters})$ is computed, as the changes in the similarity with respect to the changes in camera pose parameters.

In operation 1405, camera pose parameters that maximize the similarity between the text embedding and the image embedding are determined, and a camera control command including said camera pose parameters is output.

Figure 15:
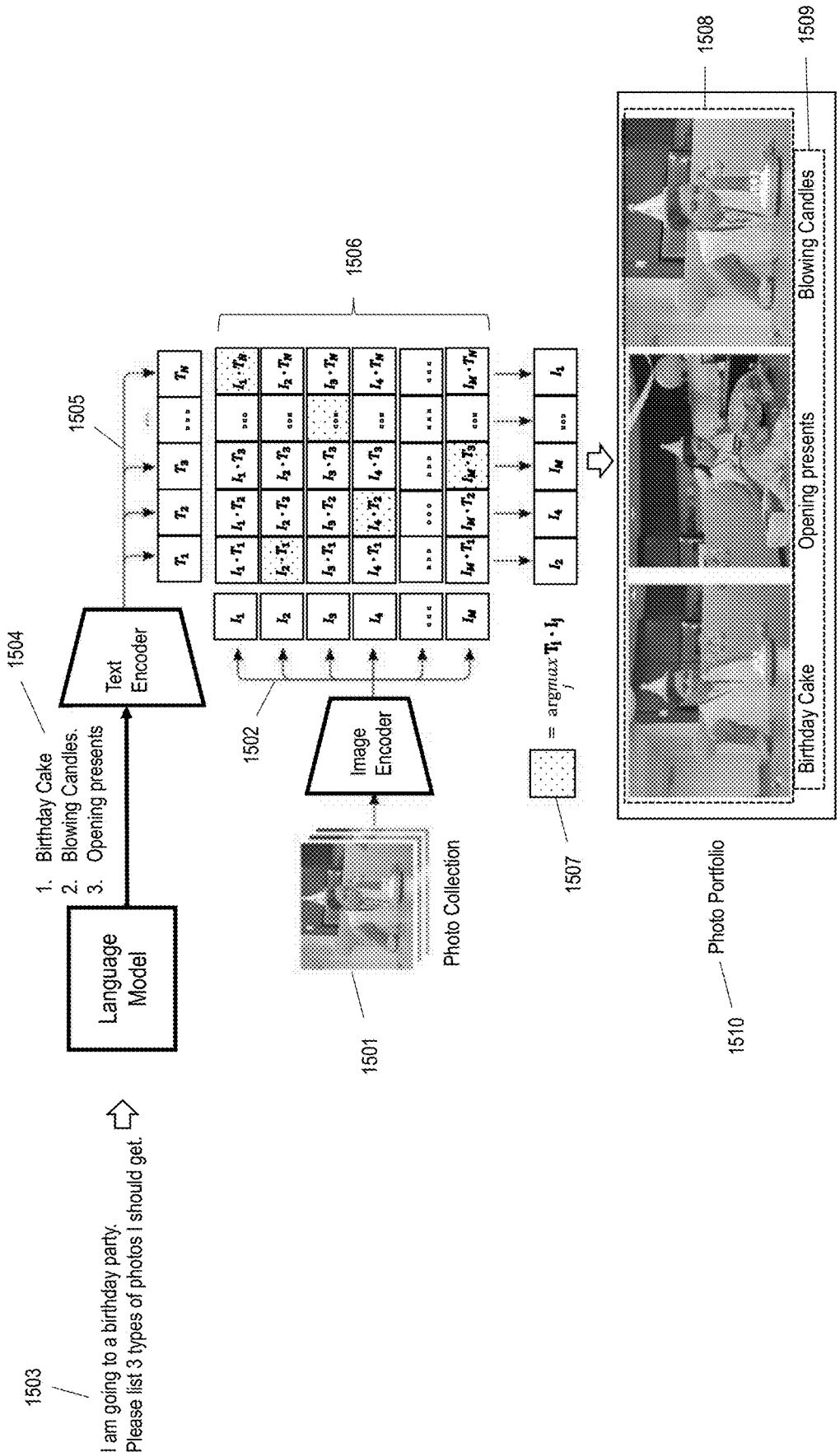
FIG. 15 illustrates a method of selecting best photos from a photo collection, according to one or more embodiments of the present disclosure.

FIG. 15 illustrates a method of selecting best photos from a photo collection, according to one or more embodiments of the present disclosure.

A set of photos may be captured and become part of the photo collection through the processes illustrated in FIGS. 2-6, 9-10, and 12-14 using the photo collection module 121, the photo caption generation module 124, and the camera pose control module 125 illustrated in FIG. 1.

Once the photo collection is obtained, the photo selection module 122 (see FIG. 1) may select best photos from the photo collection.

As shown in FIG. 15, a plurality of photos 1501 within the photo collection are input into an image encoder, resulting in image embeddings $I_1, I_2, \ldots, I_M$ 1502 being extracted from the plurality of photos, respectively. A user query 1503 specifying a target photography event is input into a large language model. The large language model outputs photoshoot suggestions 1504 relevant to the target photography event. The photoshoot suggestions 1504 are then processed through a text encoder which extracts text embeddings $T_1, T_2, \ldots, T_N$ 1505 from the photoshoot suggestions 1504, respectively. Subsequently, similarity scores for a plurality of pairs $I_1 \cdot T_1, I_1 \cdot T_2, \ldots, I_1 \cdot T_N, I_2 \cdot T_1, I_2 \cdot T_2, \ldots T_N, I_M \cdot T_1, I_M \cdot T_2, I_M \cdot T_N$ 1506 between the image embeddings $I_1, I_2, \ldots, I_M$ 1502 and the text embeddings $T_1, T_2, \ldots, T_N$ 1505 are computed. Among the plurality of pairs of the image embeddings and the text embeddings 1506, a predetermined number of image-text embedding pairs 1507 which have the highest similarity scores are selected. The images 1508 and the photoshoot suggestions 1509 corresponding to the selected image-text embedding pairs are presented to a user as a photo portfolio 1510. For example, an argmax function (e.g., $\text{argmax}_j T_i \cdot I_j$) may be used to identify the image-text embedding pairs 1507 with the highest similarity scores. If the user query 1503 includes a request for three photos, three image-text embedding pairs with the highest similarity scores are selected, and the associated images and the corresponding photoshoot suggestions are presented to the user. This process ensures that the user receives the most relevant images and photoshoot suggestions based on the user query and the computed similarity scores.

In embodiments of this disclosure, when face information, specifically face-name pairs, is provided, the number of matches between the names found in the photoshoot suggestions and the faces detected within the images contained in the photo collection is counted. For each of these face-name pairs, a similarity score is computed for each of the face-name pairs, and face-name pairs that exhibit the highest similarity scores are presented to the user.

The AI-based photo portfolio generation application uses an image generation model to generate images directly based on photoshoot suggestions produced by a prompt (i.e., a language model query) illustrated in FIG. 8. The image generation model may be a machine learning model which is trained to take text strings as input and produce images as output, where the contents of the image reflect the description given by the text string.

The image generation model is trained on large corpuses of text-image pairs, for example, which is obtained from the internet. In particular, the image generation model is trained using a denoising objective, where some random noise is introduced into the image, and the image generation model (e.g., a transformer architecture within the image generation model) learns to predict the original image based on the noisy image and the input text string. The level of noise is varied from very low to very high during the training process. The image generation model is also referred to as a diffusion model.

When the diffusion model is sampled (i.e. used to generate new images), the diffusion model is queried with the input text string along with an image made up of pure noise, and it attempts to remove the noise. The denoised image it produces initially is usually low quality. More noise is added to the output, and then fed back into the input, to generate a new denoised image in an iterative process. Once this process has been run many times (e.g. 100), with less noise being injected at each step, the final output is a high-quality generated image.

When a diffusion model is used to generate images for the AI-based photo portfolio generation application, the photoshoot suggestions are fed as input into the model. More specifically, each photoshoot suggestion is input into the model individually, and the diffusion process is run one or more times to generate images that conform to that suggestion.

Figure 16:
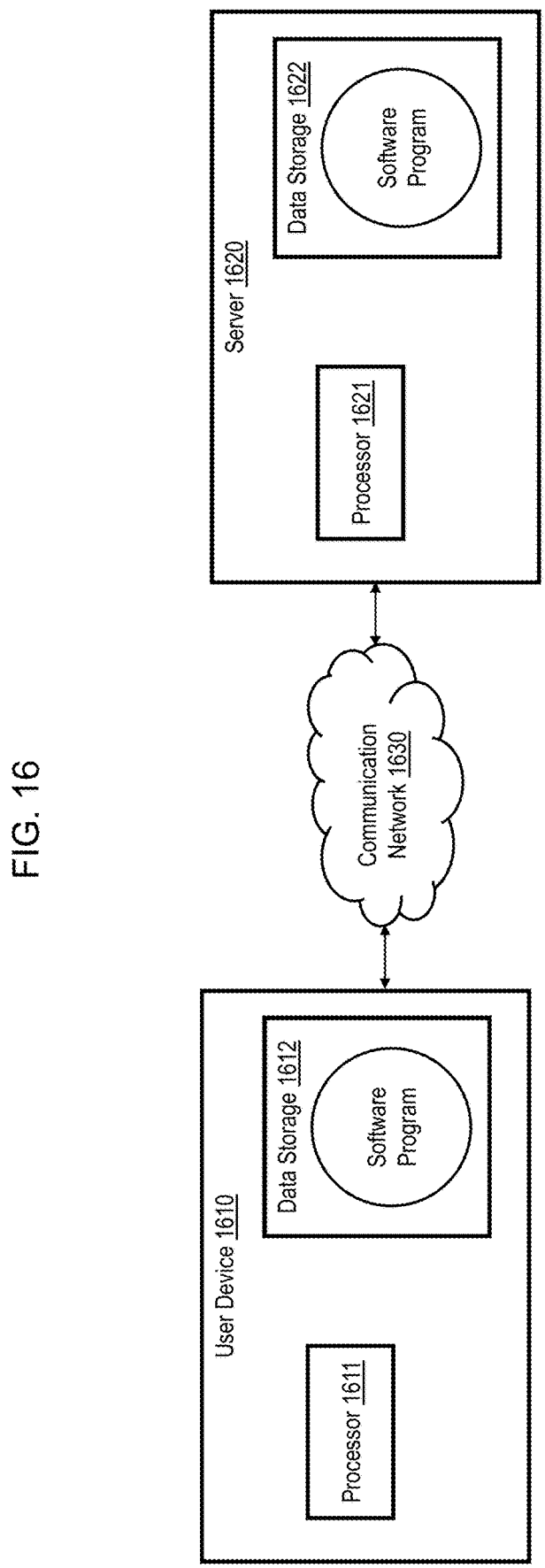
FIG. 16 is a diagram of devices for performing a multi-modal retrieval task, according to one or more embodiments of the present disclosure.

FIG. 16 is a diagram of devices for performing a multimodal retrieval task, according to one or more embodiments of the present disclosure. FIG. 16 includes a user device 1610, a server 1620, and a communication network 1630. The user device 1610 and the server 1620 may interconnect via wired connections, wireless connections, or a combination of wired and wireless connections.

The user device 1610 includes one or more devices (e.g., a processor 1611 and a data storage 1612) configured to retrieve an image corresponding to a search query. For example, the user device 1610 may include a computing device (e.g., a desktop computer, a laptop computer, a tablet computer, a handheld computer, a smart speaker, a server, etc.), a mobile phone (e.g., a smart phone, a radiotelephone, etc.), a camera device, a wearable device (e.g., a pair of smart glasses, a smart watch, etc.), or a similar device.

The server 1620 includes one or more devices (e.g., a processor 1621 and a data storage 1622) configured execute any one or any combination of the photo collection module 121, a photo selection module 122, an image processing 123, a photo caption generation module 124, and a camera pose control module 125.

The communication network 1630 includes one or more wired and/or wireless networks. For example, the communication network 1630 may include a cellular network, a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, or the like, and/or a combination of these or other types of networks.

The number and arrangement of devices and networks shown in FIG. 16 are provided as an example. In practice, there may be additional devices and/or networks, fewer devices and/or networks, different devices and/or networks, or differently arranged devices and/or networks than those shown in FIG. 16. Furthermore, two or more devices shown in FIG. 16 may be implemented within a single device, or a single device shown in FIG. 16 may be implemented as multiple, distributed devices. Additionally, or alternatively, a set of devices (e.g., one or more devices) may perform one or more functions described as being performed by another set of devices.

FIG. 17 is a diagram of components of one or more electronic devices of FIG. 16, according to one or more embodiments of the present disclosure. An electronic device 1700 in FIG. 17 may correspond to the user device 1610 and/or the server 1620.

FIG. 17 is for illustration only, and other embodiments of the electronic device 1700 could be used without departing from the scope of this disclosure. For example, the electronic device 1700 may correspond to a client device or a server.

The electronic device 1700 includes a bus 1710, a processor 1720, a memory 1730, an interface 1740, and a display 1750.

The bus 1710 includes a circuit for connecting the components 1720 to 1750 with one another. The bus 1710 functions as a communication system for transferring data between the components 1720 to 1750 or between electronic devices.

The processor 1720 includes one or more of a central processing unit (CPU), a graphics processor unit (GPU), an accelerated processing unit (APU), a many integrated core (MIC), a field-programmable gate array (FPGA), or a digital signal processor (DSP). The processor 1020 is able to perform control of any one or any combination of the other components of the electronic device 1700, and/or perform an operation or data processing relating to communication. For example, the processor 1720 may perform the methods illustrated in FIGS. 2-6, 9, 10, and 12-15. The processor 1720 executes one or more programs stored in the memory 1730.

The memory 1730 may include a volatile and/or non-volatile memory. The memory 1730 stores information, such as one or more of commands, data, programs (one or more instructions), applications 1734, etc., which are related to at least one other component of the electronic device 1700 and for driving and controlling the electronic device 1700. For example, commands and/or data may formulate an operating system (OS) 1732. Information stored in the memory 1730 may be executed by the processor 1720.

The applications 1734 include the above-discussed embodiments. These functions can be performed by a single application or by multiple applications that each carry out one or more of these functions. For example, the applications 1734 may include an artificial intelligence (AI) model for performing the methods illustrated in FIGS. 2-6, 9-10, and 12-14.

The display 1750 includes, for example, a liquid crystal display (LCD), a light emitting diode (LED) display, an organic light emitting diode (OLED) display, a quantum-dot light emitting diode (QLED) display, a microelectromechanical systems (MEMS) display, or an electronic paper display. The display 1050 can also be a depth-aware display, such as a multi-focal display. The display 1050 is able to present, for example, various contents, such as text, images, videos, icons, and symbols.

The interface 1740 includes input/output (I/O) interface 1742, communication interface 1744, and/or one or more sensors 1746. The I/O interface 1742 serves as an interface that can, for example, transfer commands and/or data between a user and/or other external devices and other component(s) of the electronic device 1700.

The communication interface 1744 may enable communication between the electronic device 1000 and other external devices, via a wired connection, a wireless connection, or a combination of wired and wireless connections. The communication interface 1744 may permit the electronic device 1700 to receive information from another device and/or provide information to another device. For example, the communication interface 1044 may include an Ethernet interface, an optical interface, a coaxial interface, an infrared interface, a radio frequency (RF) interface, a universal serial bus (USB) interface, a Wi-Fi interface, a cellular network interface, or the like. The communication interface 1744 may receive videos and/or video frames from an external device, such as a server.

The sensor(s) 1746 of the interface 1740 can meter a physical quantity or detect an activation state of the electronic device 1700 and convert metered or detected information into an electrical signal. For example, the sensor(s) 1746 can include one or more cameras or other imaging sensors for capturing images of scenes. The sensor(s) 1746 can also include any one or any combination of a microphone, a keyboard, a mouse, and one or more buttons for touch input. The sensor(s) 1746 can further include an inertial measurement unit. In addition, the sensor(s) 1746 can include a control circuit for controlling at least one of the sensors included herein. Any of these sensor(s) 1746 can be located within or coupled to the electronic device 1700. The sensor(s) 1746 may receive a text and/or a voice signal that contains one or more queries.

The robot photographer control process may be written as computer-executable programs or instructions that may be stored in a medium.

The medium may continuously store the computer-executable programs or instructions, or temporarily store the computer-executable programs or instructions for execution or downloading. Also, the medium may be any one of various recording media or storage media in which a single piece or plurality of pieces of hardware are combined, and the medium is not limited to a medium directly connected to electronic device 100, but may be distributed on a network. Examples of the medium include magnetic media, such as a hard disk, a floppy disk, and a magnetic tape, optical recording media, such as CD-ROM and DVD, magneto-optical media such as a floptical disk, and ROM, RAM, and a flash memory, which are configured to store program instructions. Other examples of the medium include recording media and storage media managed by application stores distributing applications or by websites, servers, and the like supplying or distributing other various types of software.

The robot photographer control process may be provided in a form of downloadable software. A computer program product may include a product (for example, a downloadable application) in a form of a software program electronically distributed through a manufacturer or an electronic market. For electronic distribution, at least a part of the software program may be stored in a storage medium or may be temporarily generated. In this case, the storage medium may be a server or a storage medium of a server.

The foregoing disclosure provides illustration and description, but is not intended to be exhaustive or to limit the implementation to the precise form disclosed. Modifications and variations are possible in light of the above disclosure or may be acquired from practice of the implementation.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware may be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

A model related to the neural networks described above may be implemented via a software module. When the model is implemented via a software module (for example, a program module including instructions), the model may be stored in a computer-readable recording medium.

Also, the model may be a part of the electronic device described above by being integrated in a form of a hardware chip. For example, the model may be manufactured in a form of a dedicated hardware chip for artificial intelligence, or may be manufactured as a part of an existing general-purpose processor (for example, a CPU or application processor) or a graphic-dedicated processor (for example a GPU).

Also, the model may be provided in a form of downloadable software. A computer program product may include a product (for example, a downloadable application) in a form of a software program electronically distributed through a manufacturer or an electronic market. For electronic distribution, at least a part of the software program may be stored in a storage medium or may be temporarily generated. In this case, the storage medium may be a server of the manufacturer or electronic market, or a storage medium of a relay server.

While the embodiments of the disclosure have been described with reference to the figures, it will be understood by those of ordinary skill in the art that various changes in form and details may be made therein without departing from the spirit and scope as defined by the following claims.

What is claimed is:

1. An electronic device for controlling a photographic system, the electronic device comprising:
    a memory storing one or more instructions; and
    one or more processors configured to:
        obtain a video stream and a user query for a target event;
        obtain a set of photos from the video stream;
        obtain at least one photoshoot suggestion based on the user query via a language model;
        obtain a snapped photo for the target event based on the at least one photoshoot suggestion, in response to a given video frame included in the video stream satisfying a target content criterion; and
        output one or more photos selected from the set of photos and the snapped photo as event photos.

2. The electronic device of claim 1, wherein the given video frame meets the target content criterion when a similarity score between a text embedding extracted from the current video frame and an image embedding extracted from the at least one photoshoot suggestion, is greater than similarity scores between each of text embeddings extracted from previous video frames within the video stream and the image embedding extracted from the at least one photoshoot suggestion.

3. The electronic device of claim 1, further comprising a first camera configured to acquire the video stream and a second camera configured to acquire the snapped photo, wherein:
    the at least one photoshoot suggestion comprises a plurality of photoshoot suggestions,
    any one or any combination of the one or more processors are configured to:
        extract an image embedding from the current video frame acquired at a current pose of the first camera;
        obtain a plurality of text embeddings from the plurality of photoshoot suggestions, respectively;
        compute similarity scores between the image embedding and each of the plurality of text embeddings;
        select a first photoshoot suggestion that has a highest similarity score, from among the similarity scores;
        increment a counter that is initially set for the selected first photoshoot suggestion over time;
        decrease the similarity score for the selected first photoshoot suggestion over time by reducing the similarity score by a value of the counter that increases over time;
        select a second photoshoot suggestion that initially had a second-highest similarity score and has surpassed all other photoshoot suggestions in similarity score; and
        adjust the current pose of the first camera to capture the selected second photoshoot suggestion.

4. The electronic device of claim 1, further comprising a first camera configured to acquire the video stream and a second camera configured to acquire the snapped photo, wherein any one or any combination of the one or more processors are configured to:
    extract an image embedding from the given video frame that is acquired at a current pose of the first camera;
    obtain a text embedding from the at least one photoshoot suggestion;
    acquire translation coordinates and rotation angles of a next pose of the first camera, based on a change in similarity between the image embedding and the text embedding with respect to change in each pixel in the video frame;

adjust the pose of the first camera based on the translation coordinates and the rotation angles; and control the first camera to acquire a next video frame in the adjusted pose.

5. The electronic device of claim 1, further comprising a first camera configured to acquire the video stream and a second camera configured to acquire the snapped photo, wherein any one or any combination of the one or more processors are configured to:

extract an image embedding from the video frame that is acquired at a current pose of the first camera;

obtain a text embedding from the at least one photoshoot suggestion;

acquire translation coordinates and rotation angles of a next pose of the first camera, based on a change in similarity between the image embedding and the text embedding with respect to change in camera pose parameters of the current pose of the first camera, adjust the pose of the first camera based on the translation coordinates and the rotation angles; and control the camera to acquire a next video frame in the adjusted pose.

6. The electronic device of claim 1, wherein any one or any combination of the one or more processors are configured to:

construct a full query based on the user query;

input the full query to the language model;

acquire the at least one photoshoot suggestion as an output of the language model; and control a camera to obtain the snapped photo based on the at least one photoshoot suggestion.

7. The electronic device of claim 6, wherein any one or any combination of the one or more processors are configured to:

obtain a voice signal during the target event;

identify a key event descriptor based on the voice signal acquired during the target event;

construct the full query based on the user query and the key event descriptor identified from the voice signal; and input the full query to the language model to acquire the least one photoshoot suggestion that reflects the identified key event descriptor.

8. The electronic device of claim 1, wherein any one or any combination of the one or more processors are configured to:

identify a key event descriptor from the set of photos;

construct a full query based on the key event descriptor identified from the set of photos and the user query; and input the full query to the language model to acquire the least one photoshoot suggestion that reflects the identified key event descriptor.

9. The electronic device of claim 1, wherein any one or any combination of the one or more processors are configured to:

determine whether any one of the at least one photoshoot suggestion includes a photography composition directive; and discard the photoshoot suggestion including the photography composition directive.

10. The electronic device of claim 1, wherein any one or any combination of the one or more processors are configured to:

determine whether to use a photo gallery application or a camera application based on device capabilities of the electronic device and the user query;

based on the photo gallery application being activated, access a photo gallery of the electronic device to acquire the set of photos that has been stored in the memory; and based on the camera application being activated, acquire the set of photos and the snapped photo to be stored in the memory.

11. A method for controlling a photographic system, the method comprising:

obtaining a video stream and a user query for a target event;

obtaining a set of photos from the video stream;

obtaining at least one photoshoot suggestion based on the user query via a language model;

obtaining a snapped photo for the target event based on the at least one photoshoot suggestion, in response to a given video frame included in the video stream satisfying a target content criterion; and outputting one or more photos selected from the set of photos and the snapped photo as event photos.

12. The method of claim 11, further comprising:

determining that the given video frame satisfies the target content criterion when a similarity score between a text embedding extracted from the given video frame and an image embedding extracted from the at least one photoshoot suggestion, is greater than similarity scores between each of text embeddings extracted from previous video frames within the video stream and the image embedding extracted from the at least one photoshoot suggestion.

13. The method of claim 11, wherein:

the video stream is acquired by a first camera, and the snapped photo is acquired by a second camera, the at least one photoshoot suggestion comprises a plurality of photoshoot suggestions, and the method further comprises:

extracting an image embedding from the given video frame acquired at a given pose of the first camera;

obtaining a plurality of text embeddings from the plurality of photoshoot suggestions, respectively;

computing similarity scores between the image embedding and each of the plurality of text embeddings;

selecting a first photoshoot suggestion that has a highest similarity score, from among the similarity scores;

incrementing a counter that is initially set for the selected first photoshoot suggestion over time;

decreasing the similarity score for the selected first photoshoot suggestion over time by reducing the similarity score by a value of the counter that increases over time;

selecting a second photoshoot suggestion that initially had a second-highest similarity score and has surpassed all other photoshoot suggestions in similarity score; and adjusting the given pose of the first camera to capture the selected second photoshoot suggestion.

14. The method of claim 11, wherein:

the video stream is acquired by a first camera, and the snapped photo is acquired by a second camera, and the method further comprises:

extracting an image embedding from the given video frame that is acquired at a given pose of the first camera;

obtaining a text embedding from the at least one photoshoot suggestion;

acquiring translation coordinates and rotation angles of a next pose of the first camera, based on a change in similarity between the image embedding and the text embedding with respect to change in each pixel in the video frame;

adjusting the pose of the first camera based on the translation coordinates and the rotation angles; and controlling the first camera to acquire a next video frame in the adjusted pose.

15. The method of claim 11, wherein:

the video stream is acquired by a first camera, and the snapped photo is acquired by a second camera, and the method further comprises:

extracting an image embedding from the video frame that is acquired at a given pose of the first camera;

obtaining a text embedding from the at least one photoshoot suggestion;

acquiring translation coordinates and rotation angles of a next pose of the first camera, based on a change in similarity between the image embedding and the text embedding with respect to change in camera pose parameters of the given pose of the first camera;

adjusting the pose of the first camera based on the translation coordinates and the rotation angles; and controlling the camera to acquire a next video frame in the adjusted pose.

16. The method of claim 11, further comprising:

constructing a full query based on the user query;

inputting the full query to the language model;

acquiring the at least one photoshoot suggestion as an output of the language model; and controlling a camera to obtain the snapped photo based on the at least one photoshoot suggestion.

17. The method of claim 11, further comprising:

obtaining a voice signal during the target event;

identifying a key event descriptor based on the voice signal acquired during the target event;

constructing the full query based on the user query and the key event descriptor identified from the voice signal; and inputting the full query to the language model to acquire the least one photoshoot suggestion that reflects the identified key event descriptor.

18. The method of claim 11, further comprising:

identifying a key event descriptor from the set of photos;

constructing a full query based on the key event descriptor identified from the set of photos based on the user query; and inputting the full query to the language model to acquire the least one photoshoot suggestion that reflects the identified key event descriptor.

19. The method of claim 11, further comprising:

determining whether any one of the at least one photoshoot suggestion includes a photography composition directive; and discarding the photoshoot suggestion including the photography composition directive.

20. A non-transitory computer-readable storage medium storing a program that is executable by a processor to perform a method for controlling a photographic system, the method comprising:

obtaining a video stream and a user query for a target event;

obtaining a set of photos from the video stream;

obtaining at least one photoshoot suggestion based on the user query via a language model;

obtaining a snapped photo for the target event based on the at least one photoshoot suggestion, in response to a given video frame included in the video stream satisfying a target content criterion; and outputting one or more photos selected from the set of photos and the snapped photo as event photos.

* * * * *